United States Patent [19]

Haselwood et al.

[11] 4,425,578

[45] Jan. 10, 1984

[54] MONITORING SYSTEM AND METHOD UTILIZING SIGNAL INJECTION FOR DETERMINING CHANNEL RECEPTION OF VIDEO RECEIVERS

[75] Inventors: Donald E. Haselwood; Jeffrey R. Thumm, both of Clearwater, Fla.

[73] Assignee: A. C. Nielsen Company, Northbrook, Ill.

[21] Appl. No.: 224,586

[22] Filed: Jan. 12, 1981

[51] Int. Cl.³ .............................................. H04M 1/00
[52] U.S. Cl. .................. 358/84; 358/191.1; 455/150
[58] Field of Search ............... 455/2; 358/84, 86, 191, 358/192, 193; 455/150, 154

[56] References Cited

U.S. PATENT DOCUMENTS

| | | | |
|---|---|---|---|
| 3,864,636 | 2/1975 | Fukuda et al. | 455/182 |
| 4,020,419 | 4/1977 | Caspari et al. | 455/182 |
| 4,216,497 | 8/1980 | Ishman et al. | 455/2 |

*Primary Examiner*—Tommy P. Chin
*Assistant Examiner*—Edward L. Coles
*Attorney, Agent, or Firm*—Mason, Kolehmainen, Rathburn & Wyss

[57] ABSTRACT

A system and method is provided for determining the channel to which a video wave receiver is tuned. The system includes an RF signal source connected to the antenna input of the video wave receiver, a frequency control stage that determines the signal frequencies generated by the RF signal source and a system and advance control stage to appropriately program operation of the frequency control stage. The RF signal source is conditioned by the system and advance control stage and the frequency control stage to output signals such that the fundamental or one of the harmonics when combined with the video carrier of a corresponding channel results in a signal having a predetermined frequency. The RF signal source is successively advanced to output a set of predetermined frequencies, corresponding to each of the receivable channels to which the video receiver is tunable. The system includes a detector/receiver arranged to monitor the video signal of the video receiver to detect the predetermined frequency resulting from the combined signal from the RF signal source and a video carrier to which the video receiver is tuned. The RF signal source is stepped through a predetermined set of frequencies corresponding to each receivable channel and the system outputs a signal denoting the received channel to which the video receiver is tuned when the predetermined frequency is detected by the detector/receiver.

34 Claims, 16 Drawing Figures

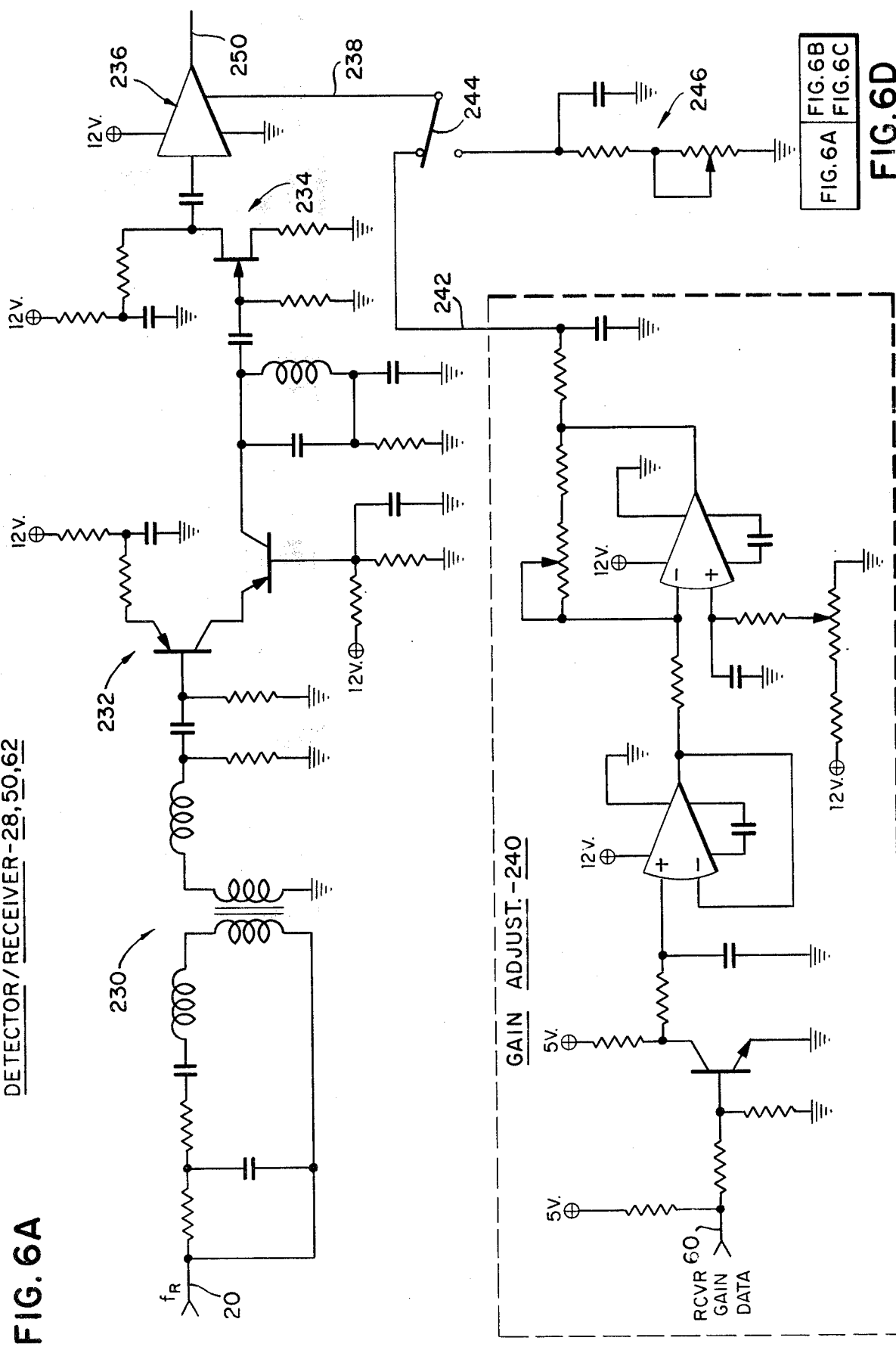

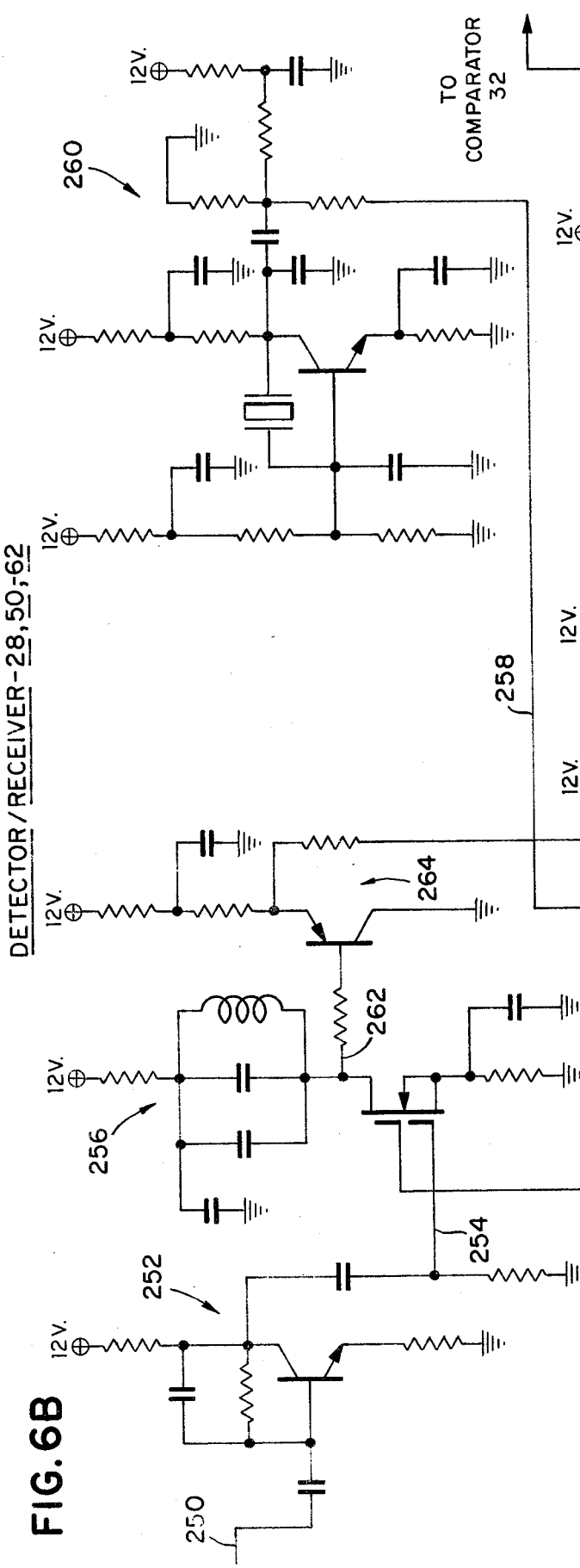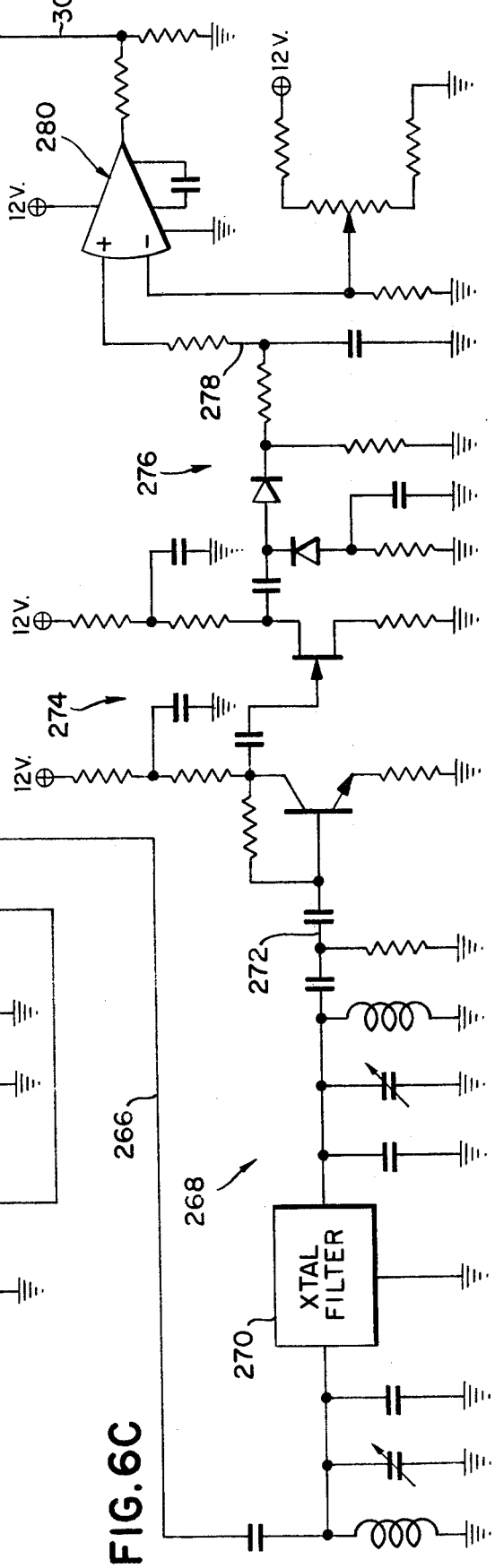
FIG.6B
FIG.6C

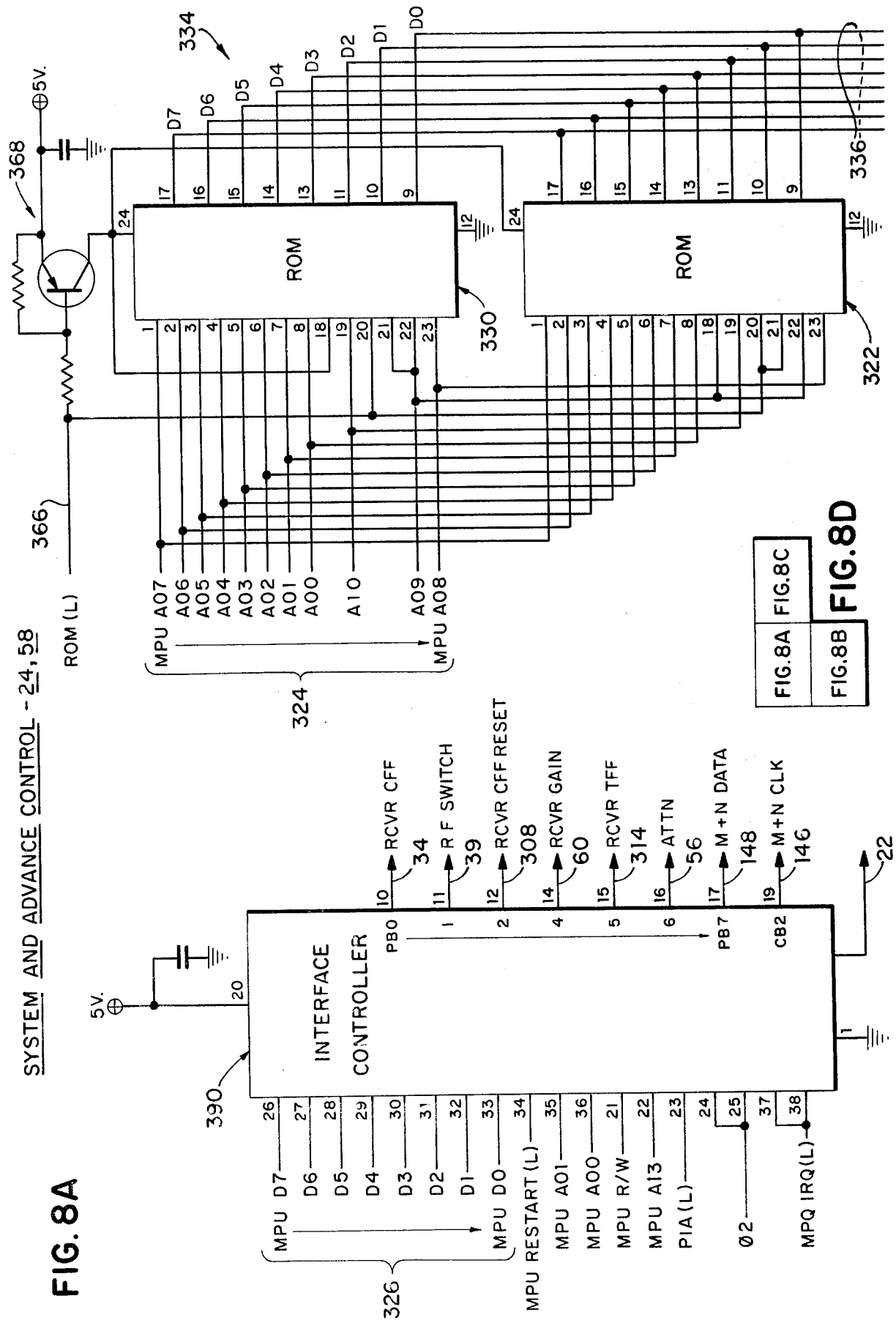

MONITORING SYSTEM AND METHOD UTILIZING SIGNAL INJECTION FOR DETERMINING CHANNEL RECEPTION OF VIDEO RECEIVERS

BACKGROUND OF THE INVENTION

1. Field of the Invention

The present invention relates generally to video receiver monitors and more particularly to a system for determining the channel to which a video wave receiver is tuned by the injection of signals at the antenna input of the video receiver.

2. Description of the Prior Art

Various arrangements of the prior art have been proposed to determine the channel to which a television receiver is tuned. For example, mechanical arrangements for determining the channel to which a television receiver is tuned and requiring direct mechanical couplings to the channel selection elements of a receiver tuner are disclosed in U.S. Pat. Nos. 2,751,449 which issued to Krahulec, et al. on June 19, 1956 and 4,038,504 which issued to McAnulty, et al. on July 26, 1977. While such mechanical interconnection arrangements are reliable, the direct mechanical couplings require skilled installation and removal of parts. Further, variations in the mechanical configurations of tuner elements of various receivers require a large assortment of adapters to implement the mechanical couplings.

U.S. Pat. No. 3,973,206 which issued to D. E. Haselwood, et al. on Aug. 3, 1976 discloses a method of determining channel tuning by monitoring the varactor diode tuning voltage to overcome the problems of mechanical couplings. However, installation of this type of monitoring arrangement requires internal connections in the TV receiver and is applicable only to voltage tuned receivers.

Another method to determine channel tuning disclosed in U.S. Pat. No. 2,864,941 which issued to Currey, et al. on Dec. 16, 1958 detects the effect of switching tuned circuits coupled to the antenna input in synchronism with the horizontal sweep. This method requires a transmission line that is reasonably well matched to the receiver for proper functioning.

Another method to determine the channel to which a receiver is tuned is disclosed in U.S. Pat. No. 4,044,376 which issued to J. L. Porter on Aug. 23, 1977 and U.S. Pat. No. 4,058,829 which issued to J. R. Thomson on Nov. 15, 1977. In this method, the antenna input to the receiver is switched to an RF oscillator during an RF pulse to eliminate the possibility of signals from the antenna causing video outputs that might be confused with the RF oscillator pulse input. The RF oscillator is pulsed in synchronism with the sweep of the receiver and stepped in frequency to each possible receivable channel. When the video signal shows a pulse in correspondence with the RF oscillator, the RF oscillator is assumed to be set to the channel tuned by the receiver. This method has the disadvantage that false indications can occur should a receiver be tuned to a UHF channel such that harmonics of a lower frequency VHF channel would fall into the UHF channel. For example, VHF channel 2 has a ninth harmonic falling into UHF channel 20. Furthermore, this method determines the channel tuned by the receiver and not the channel being received since the method does not in any way depend on the reception of a transmitted video carrier channel signal.

Another method disclosed in U.S. Pat. No. 2,903,508 which issued to J. L. Hathaway on Sept. 8, 1959 adds single sideband audio signals to an NTSC video signal at a low level and in between the spectral peaks of horizontal sync harmonics to allow a usable audio signal to be recovered without noticeably degrading the video to the viewer. This method when applied to the determination of a channel tuned by a receiver includes the disadvantage of the necessity to accurately control the level of the coupled signal to prevent too large a signal from causing interference in the viewed picture while providing a large enough signal such that a reliable indication of the signal coupled into the receiver is sufficiently above the noise due to video signals.

SUMMARY OF THE INVENTION

Accordingly, it is a principal object of the present invention to provide a new and improved system and method for determining the channel to which a video receiver is tuned and which overcomes one or more of the disadvantages of the prior art.

It is another object of the present invention to provide a system and method for determining the channel to which a video receiver is tuned wherein the output of an RF signal source is coupled to the antenna input of the receiver, the signal source is successively stepped through a predetermined set of frequencies corresponding to each of the receivable channels, and the video output of the receiver is monitored to detect a predetermined frequency resulting from the combination of the RF signal source frequency and the received channel signal.

In accordance with a preferred embodiment of the present invention, a system and method is provided for determining the channel to which a video wave receiver is tuned. The system includes an RF signal source connected to the antenna input of the video wave receiver, a frequency control stage that determines the signal frequencies generated by the RF signal source and a system and advance control stage to appropriately program operation of the frequency control stage. The RF signal source is conditioned by the system and advance control stage and the frequency control stage to output signals such that the fundamental or one of the harmonics when combined with the video carrier of a corresponding channel results in a signal having a predetermined frequency. The RF signal source is successively advanced to output a set of predetermined frequencies, corresponding to each of the receivable channels to which the video receiver is tunable. The system includes a detector/receiver arranged to monitor the video signal of the video receiver to detect the predetermined frequency resulting from the combined signal from the RF signal source and a video carrier to which the video receiver is tuned. The RF signal source is stepped through a predetermined set of frequencies corresponding to each receivable channel and the system outputs a signal denoting the received channel to which the video receiver is tuned when the predetermined frequency is detected by the detector/receiver.

The system and advance control stage includes a microprocessor and associated memory and peripheral controller devices for storing and outputting data to condition the RF signal source to generate the appropriate signals; the generated signals corresponding to each of the received channels in various frequency set formats for efficiently establishing the channel to which the video receiver is tuned.

The frequencies of the signals generated by the RF signal source, as determined by the system and advance control, are calculated such that the harmonics of the generated signal will not fall within the bandwidth of the detector/receiver when combined with any of the other received channel video carriers other than the corresponding channel associated with the predetermined frequency. Thus, the frequencies generated by the RF signal source ensure that none of the harmonics will produce a false output.

In a preferred arrangement, the RF signal source is operated in a pulse mode to minimize interference to the viewer of the video receiver. Further, the system includes a comparator stage driven by the output of the detector/receiver stage with the comparator indicating coincidence of the pulse signal from the RF signal source and the detector/receiver output. The output of the comparator is utilized by the system and advance control stage to determine when the predetermined frequency is detected corresponding to the received channel presently being interrogated. In other arrangements, the output of the RF signal source is continuous rather than pulsed and the gain of the detector/receiver is adjusted by the system and advance control stage to provide a low level, non-interfering input from the RF signal source.

Further, the system and advance control stage in alternate arrangements monitors a number of coincidence pulses from the comparator stage to eliminate false detected outputs. In another arrangement, vertical and/or horizontal sweep synchronization of the system is provided so that the signals from the RF signal source occur during the vertical interval of the picture not normally viewed with a resultant improvement in the signal to noise ratio of the detected signal. The horizontal sweep synchronization conditions the signals from the RF signal source to occur between the horizontal sync pulses of the video lines of the vertical interval to further improve the signal to noise ratio since these lines are typically blank. In another arrangement, automatic level control of the RF signal source is provided by the system and advance control stage to assure that the detected signal is accomplished with minimum signal strength. In another alternate arrangement, the detector/receiver is selectively controlled by the system and advance control stage to be selectively tunable to multiple detector frequencies to simplify the selection of frequencies generated by the RF signal source.

The above and other objects and advantages and novel features of the present invention will become apparent from the following detailed description of a preferred embodiment of the invention taken in conjunction with the accompanying drawings.

BRIEF DESCRIPTION OF THE DRAWINGS

FIGS. 6A, B and C when assembled as shown in FIG. 6D represent a detailed block diagram and schematic representation of the detector/receiver stage of the monitoring system of FIG. 1;

DETAILED DESCRIPTION OF THE PREFERRED EMBODIMENT

Figure 1:
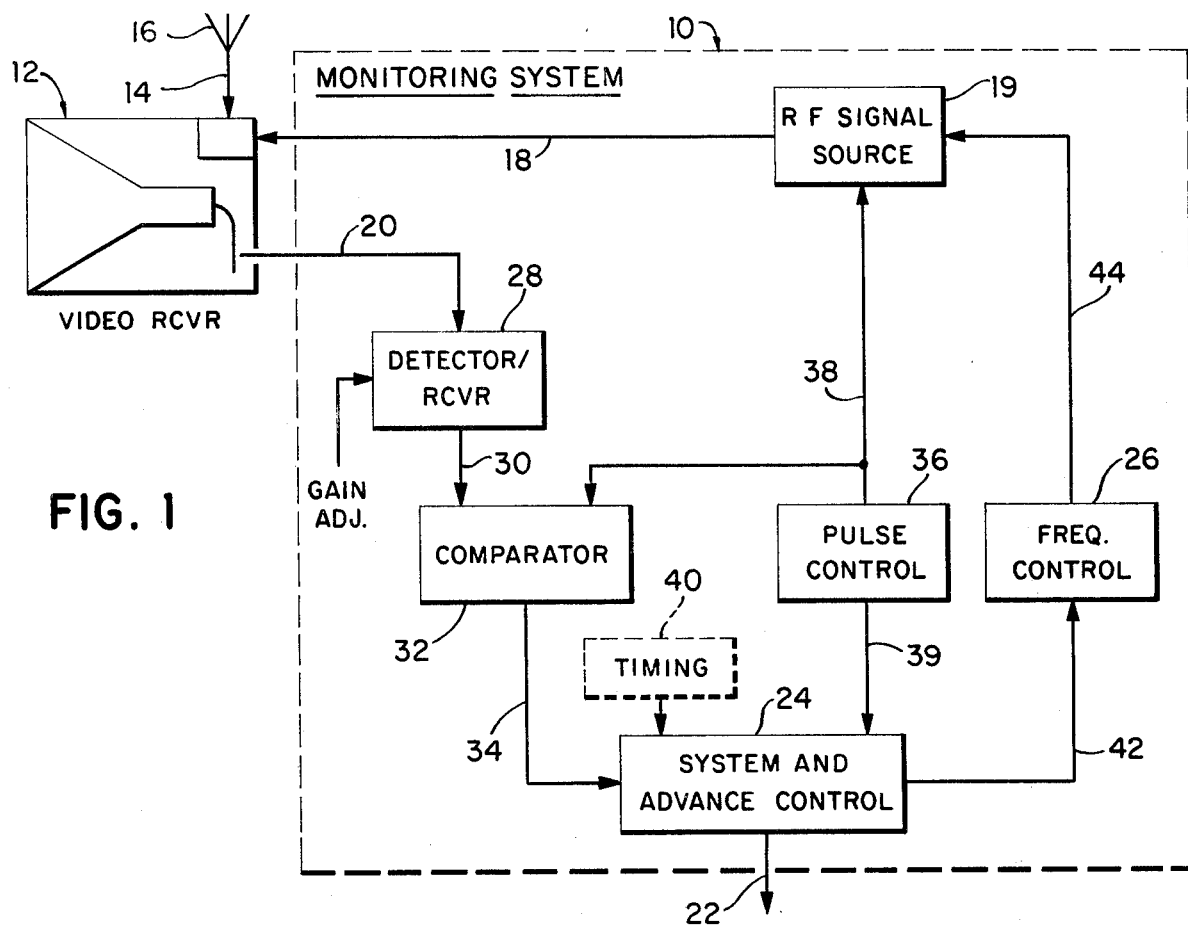
FIG. 1 is a block diagram representation of a preferred embodiment of a monitoring system in accordance with the principles of the present invention.

Referring now to FIG. 1, the monitoring system 10 of the present invention is shown in conjunction with a video receiver referred to generally at 12. The video receiver 12 includes a conventional signal input 14 connected to an antenna 16 or in other arrangements to the output of a CATV converter or other broadcast carrier source (not shown). The monitoring system 10 includes an injection signal output 18 that is connected at the signal input 14 of the video receiver through a matching network or signal combiner if required.

The monitoring system 10 at signal output 18 generates predetermined injection frequencies and at input 20 monitors the video or IF signals of the video receiver 12 to determine the channel to which the video receiver 12 is presently tuned. The monitoring system 10 generates an output at 22 representing the channel number to which the video receiver 12 is tuned. For example, the channel data at 22 along with identification of the video receiver station 12 is transmitted over a telephone line or other remote data link to a central monitoring/processing locations as shown in U.S. Pat. No. 3,651,471.

The monitoring system 10 includes a system and advance control stage 24 and a frequency control stage 26 that condition an RF signal source 19 to successively output predetermined injection signal frequencies at 18 from a predetermined set of table frequencies; each of the predetermined frequencies corresponding to one of the channels to which the video receiver 12 is capable of being tuned. Each of the predetermined frequencies at 18 from the RF signal source 19 when combined with the corresponding video carrier signal at 14 produces a predetermined detection frequency at 20 that is detected by the monitoring system 10. When the predetermined detection signal frequency at 20 is detected by the monitoring system 10, the monitoring system 10 outputs the channel data corresponding to the channel frequency being interrogated by the injection signal at 18 and the channel number to which the video receiver 12 is tuned.

The monitoring system 10 includes a detector/receiver stage 28 having as an input the detection input 20. The detector/receiver 28 produces an output at 30 to a comparator stage 32. When the predetermined detection signal frequency is detected, the comparator 32 checks the validity of the detection output 30 and produces at output 34 a coincidence signal to the system and advance control stage 24 to advise the system and advance control 24 that the channel to which the video receiver 12 is tuned has been found. In response to the coincidence detection input 34, the system and advance control stage 24 outputs the channel data 22. Specifically, the set of frequencies generated by the RF signal source 19 are calculated such that the fundamental or one of the harmonics will fall within the bandwidth of the detector/receiver 28 when summed with the video carrier of a corresponding channel to which the video receiver 12 is tuned. Further, the frequencies are calculated such that the harmonics will not fall within the bandwidth of the detector/receiver 28 when added to any of the other received station video carriers.

The monitoring system 10 includes a pulse control stage 36 that operates the RF signal source 19 in a pulse mode to allow the use of an RF injection signal level at 18 of high enough magnitude to insure detection at 20 of the combined signal with the pulse mode of operation minimizing interference to the viewer. Thus, by pulse operation of the RF signal source 19 at a low repetition rate, the injection signal at 18 will not result in any apparent interference to the video as observed by a viewer of the video receiver 12. The pulse control stage 36 provides an output at 38 to control pulse operation of the RF signal source 19 and to enable the comparator 32 to synchronize the comparison function of the detection output 30 with pulse operation of the RF signal source 19.

In the preferred embodiment of FIG. 1, a timing function is provided by the system and advance control stage 24 by means of counting pulses from the pulse control stage 36 to provide a number of injection pulses at 18 by the RF signal source 19 before the system and advance control stage 24 steps the RF signal source 19 to a frequency in the frequency set corresponding to the next channel. Alternatively, a timing stage 40 is provided (shown optionally in phantom) to provide the timing function such that the signals being generated at 18 corresponding to the present channel being interrogated are present for a predetermined number of injection pulses. The timing functions provide an adequate number of pulse detection times by the detector/receiver 28 before the system and advance control 24 steps the RF signal source 19 to the frequency corresponding to the next channel to be interrogated.

The RF signal source 19 of the preferred embodiment of FIG. 1 includes a harmonic generator and a frequency synthesizer such that the frequency synthesizer of the RF signal source 19 operates at a relatively low base frequency and the harmonics generated by the harmonic generator of the RF signal source 19 do not produce a false output when combined with the video carrier signals corresponding to tunable channels which are not being interrogated.

In the preferred arrangement, the detection input 20 is accomplished by a pickup wire placed in close proximity to the signal conductors carrying the video to the kinescope of the video receiver 12 or to the signal conductors of the IF signals. Thus, no circuit connections to the video receiver 12 are required for the monitoring system 10 except the external connection of the injection signal 18 to the antenna input of video receiver 12.

The response characteristics of the detector receiver 28 provide detection of the combined signal that results from the summation of the injection signal at 18 from the RF signal source 19 and the corresponding channel video carrier when the predetermined frequency is generated corresponding to the channel to which the video receiver 12 is tuned. Further, the response characteristics of the detector/receiver 28 prevent the false detection of signals resulting from the adding of harmonics of the generated frequencies and video carrier signals corresponding to the channels not presently being tuned by the video receiver 12.

The system and advance control stage 24 includes a stored program for selecting the appropriate frequencies for the RF signal source 19 and proceeding in a predetermined program to interrogate the channel to which the video receiver 12 is tuned. The system and advance control stage 24 includes the storage of data representing the predetermined injection frequencies corresponding to each of the channels to which the video receiver 12 is tunable. Specifically, the system and advance control stage 24 at 42 outputs coded data to the frequency control stage 26 and appropriately programs the frequency control stage 26 to output at 44 frequency control data to the RF signal source 19.

Figure 2:
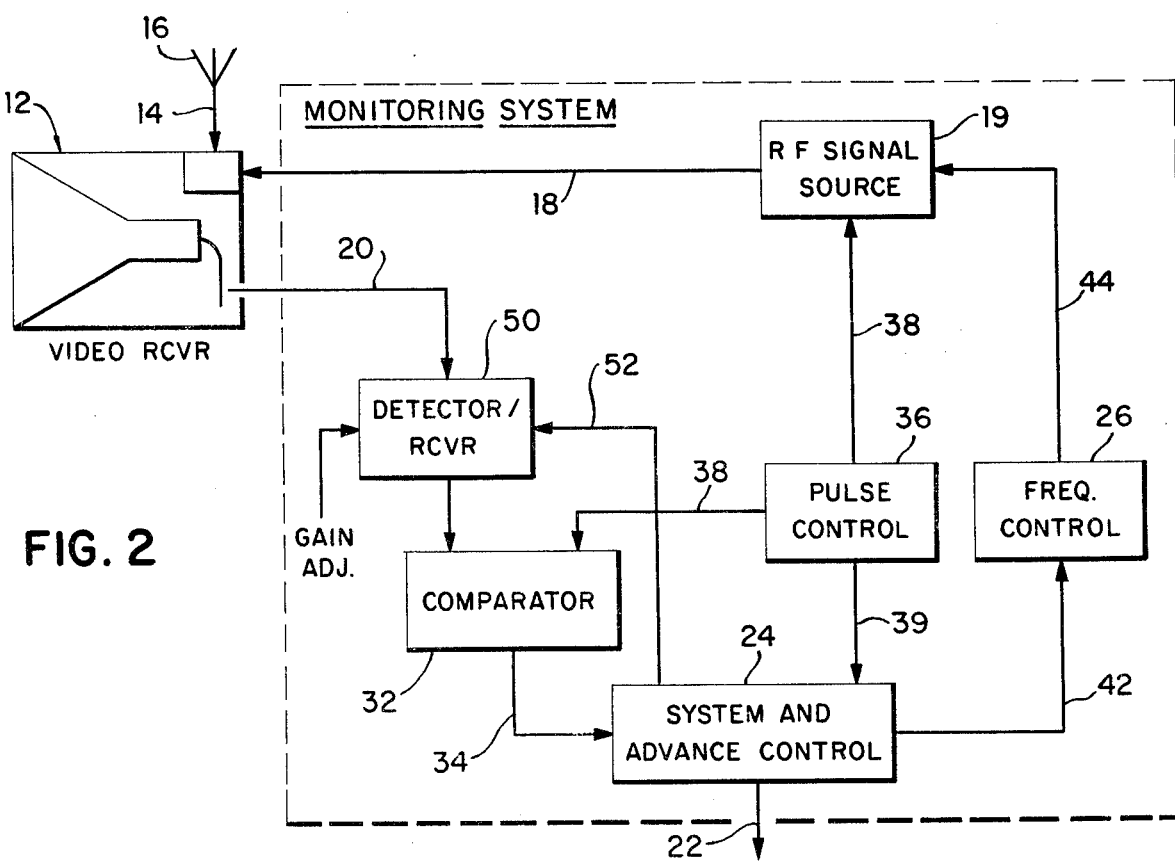
FIG. 2 is a block diagram representation of an alternate embodiment of the monitoring system of the present invention in FIG. 1 that utilizes a detector/receiver with selective multiple detector frequency operation.
Figure 3:
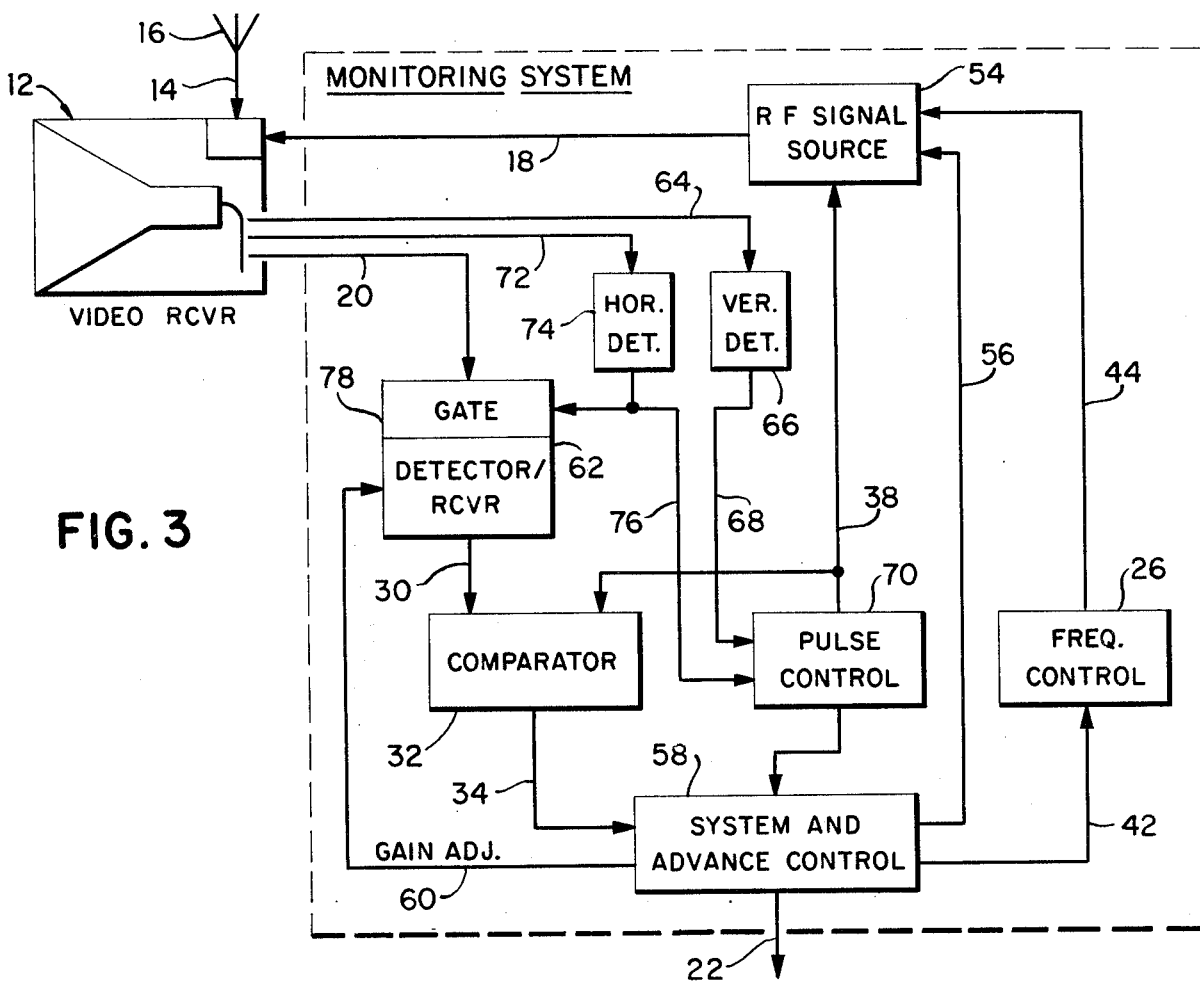
FIG. 3 is an alternate embodiment of the monitoring system of the present invention utilizing gain adjustment of the detector/receiver, horizontal and vertical sweep synchronization in the detection process, and level control for the RF signal source.
Figure 4:
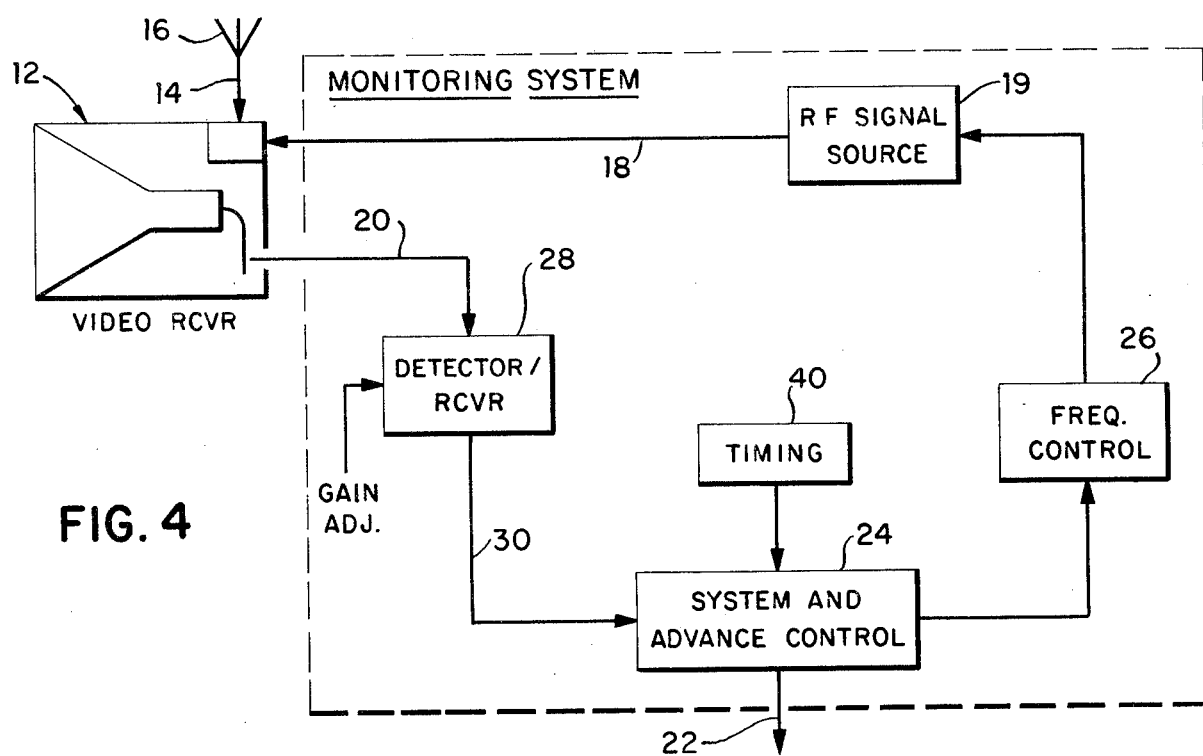
FIG. 4 is a general block diagram representation of another embodiment of the monitoring system of the present invention in which the RF signal source operates in the continuous signal mode.

Referring now to FIGS. 2 through 4, wherein identical reference numerals are utilized to refer to the elements of FIG. 1 that are similar in both operation and structure, a detector/receiver stage 50 in the system of FIG. 2 is utilized that is similar to the detector/receiver 28 of FIG. 1 and further includes multiple frequency detection capabilities. The detection frequency is selectively controlled by a frequency select input 52 from the system and advance control stage 24. The details of the multiple frequency operation of the detector/receiver 50 will be explained in more detail hereinafter in conjunction with the detailed description of the detector/receiver. The selection of one of several frequencies to which the detector/receiver 50 is responsive allows a greater freedom in selecting frequencies for the RF signal oscillator 19 that meet the criterion to provide one and only one frequency and its harmonics that results in a proper detector response. Thus, for example, a first portion of the frequencies generated by the RF signal source 19 are utilized with the detector/receiver 50 programmed to frequency No. 1 and a second portion of the frequencies generated by the RF signal source 19 are utilized with the detector/receiver 50 programmed to frequency No. 2.

Referring now to FIG. 3, an alternative embodiment of the monitoring system 10 is illustrated and incorporating a number of alternate features. Specifically, an RF signal source 54 similar in basic respects to the RF signal source 19 additionally includes an RF level control arrangement responsive to a level adjust input 56. The level adjust signal 56 is generated under the control of the system and advance control stage 58. The system and advance control stage 58 is similar to the system and advance control 24 but includes additional provisions for the generation of the level adjust signal 56. In this way, the RF signal source 54 is selectively operable at a level to provide a minimum detectable signal level of the combined signal at the video pick-up 20 to reduce the visibility of the RF oscillator pulses in the video. Further, the level control of the RF signal source 54 also reduces the chance that a very strong spurious signal outside the bandwidth of the tuner of the video receiver 12 and not completely rejected by the video receiver 12 could mix with some harmonic of the RF signal source output at 18 to produce a signal that falls in the bandwidth of the detector/receiver. In this arrangement, the system and advance control stage 58 initiates operation with the signal output level of the RF signal source 54 at a minimum predetermined setting. After all frequencies in the frequency set are generated by advancing through the complete frequency set, the system and advance control 58 via the level adjust signal 56 conditions the RF signal source 54 to output a higher RF signal level at 18. This procedure is repeated after the entire frequency set is again generated. If no detection is obtained, the RF signal source 54 is again stepped to a higher output level. This procedure assures that the predetermined detection signal is detected with a minimum signal strength at 18 of the RF signal source 54. Before proceeding with additional discussion of additional features of the monitoring system 10 of FIG. 3, it should be understood that the various additional features of the monitoring system 10 of FIG. 3 are capable of independent or combinational implementation to provide additional features and enhancement of the monitoring system 10 for specific applications.

For example, the system and advance control 58 of FIG. 3 additionally includes a gain adjust signal output 60 and the detector/receiver stage 62 includes a gain control arrangement responsive to the gain adjust signal 60 to appropriately control the gain of the detector/receiver 62. This allows the detection of the predetermined combinational signal at pickup input 20 under varying input signal conditions to the video receiver 12 at 14 and 18.

A further additional feature of the monitoring system 10 of FIG. 3 is provided by vertical sweep synchronization of the RF signal pulses 18 occurring in the vertical interval of the picture to eliminate any visible effects to the viewer of the video receiver 12. A vertical pickup input signal 64 provides a vertical sweep synchronizing signal to a vertical synchronization detector 66. The vertical synchronization detector 66 generates a control output at 68 to a pulse control stage 70 that is similar in basic respects to the pulse control stage 36 of FIG. 1. The pulse control stage 70 additionally includes circuitry responsive to the vertical detection output at 68 to synchronize operation of the RF signal source 54 in the vertical interval by means of the pulse control signal 38. The operation of the monitoring system 10 in the vertical interval also improves the signal to noise ratio of the detected signal at 20 due to the absence of video picture signals.

Additionally, the monitoring system 10 of FIG. 3 is provided with horizontal sweep synchronization by means of a horizontal pickup signal input 72 that is provided to a horizontal synchronization detector stage 74. The detector 74 provides a horizontal synchronization detection output at 76 to a pulse control stage 70. The pulse control stage 70 combines the horizontal and vertical synchronization detection signals 76 and 68 to synchronize operation of the RF signal source 54 via the pulse control signal 38 such that the RF pulses at 18 occur between the horizontal sync pulses of the video lines and in the vertical interval. This additional horizontal synchronization further improves the signal to noise ratio since these lines are typically blank. To provide additional features, the horizontal sync detection signal 76 is also connected to a gate stage 78 of the detector/receiver stage 62 to provide operation of the detector/receiver 62 only during the blank portions of the video lines to thereby remove the noise due to the horizontal sync pulses occurring during detector operation.

The system and advance control 58 is also provided with an averaging mode of operation to enable the counting of a number of coincidence pulses received at 34 from the comparator 32. This averaging mode of operation reduces the effects of spurious noise.

The monitoring system 10 of FIG. 4 illustrates an alternative embodiment without the pulse control of the RF signal source 19. In this arrangement an RF signal at 18 is provided at a predetermined low level such that interference is not objectionable in the picture. This arrangement is suitable for example in specific applications such as CATV input signals to the video receiver 12 where the signals presented to the receiver at 14 are of relatively uniform level between and across the various channels.

Figure 5A:
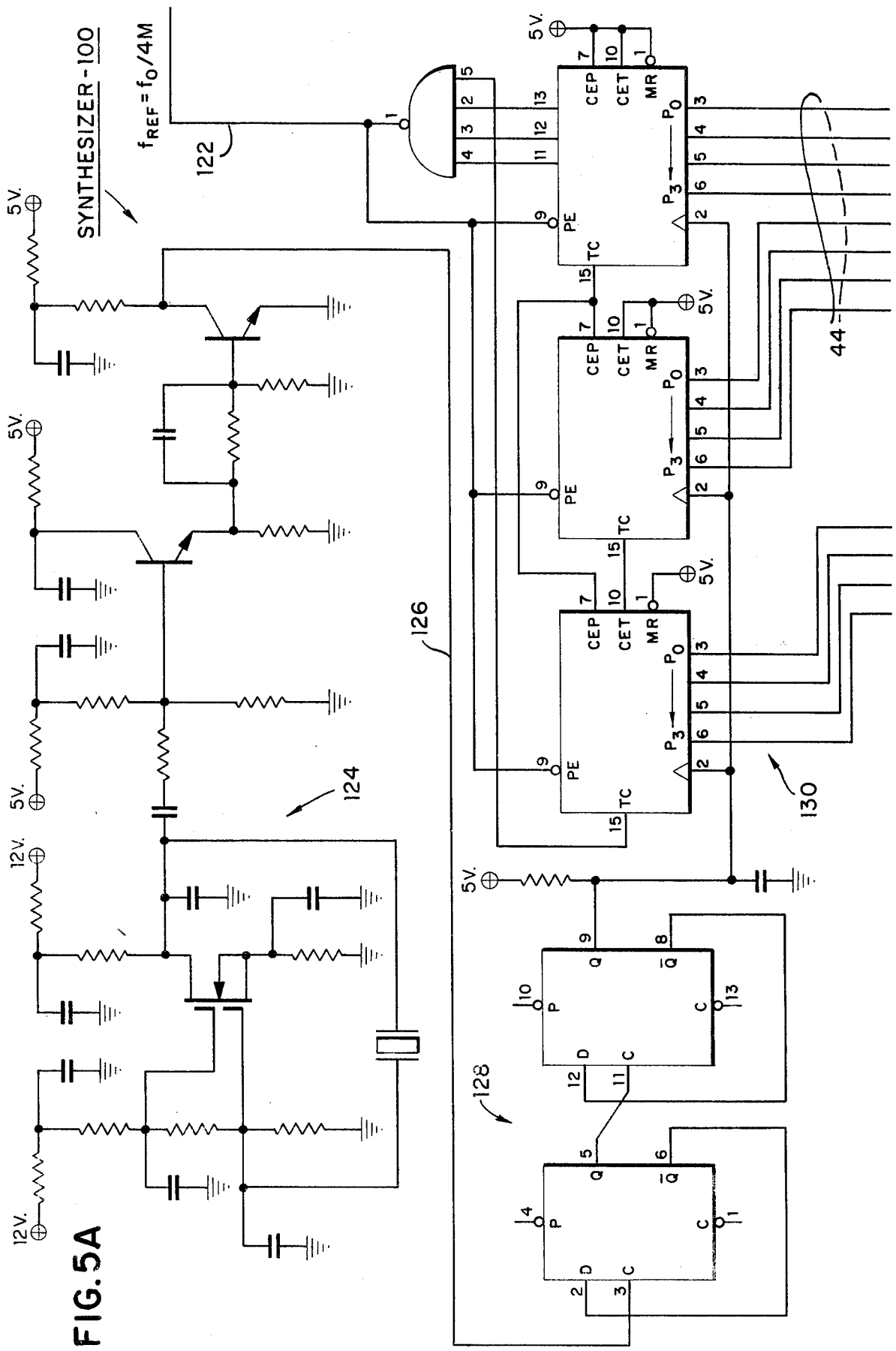
FIGS. 5A through 5E when assembled as shown in FIG. 5F represent a detailed block and schematic diagram of the RF signal source and frequency control stage of the monitoring system of FIGS. 1 and 3.
Figure 5B:
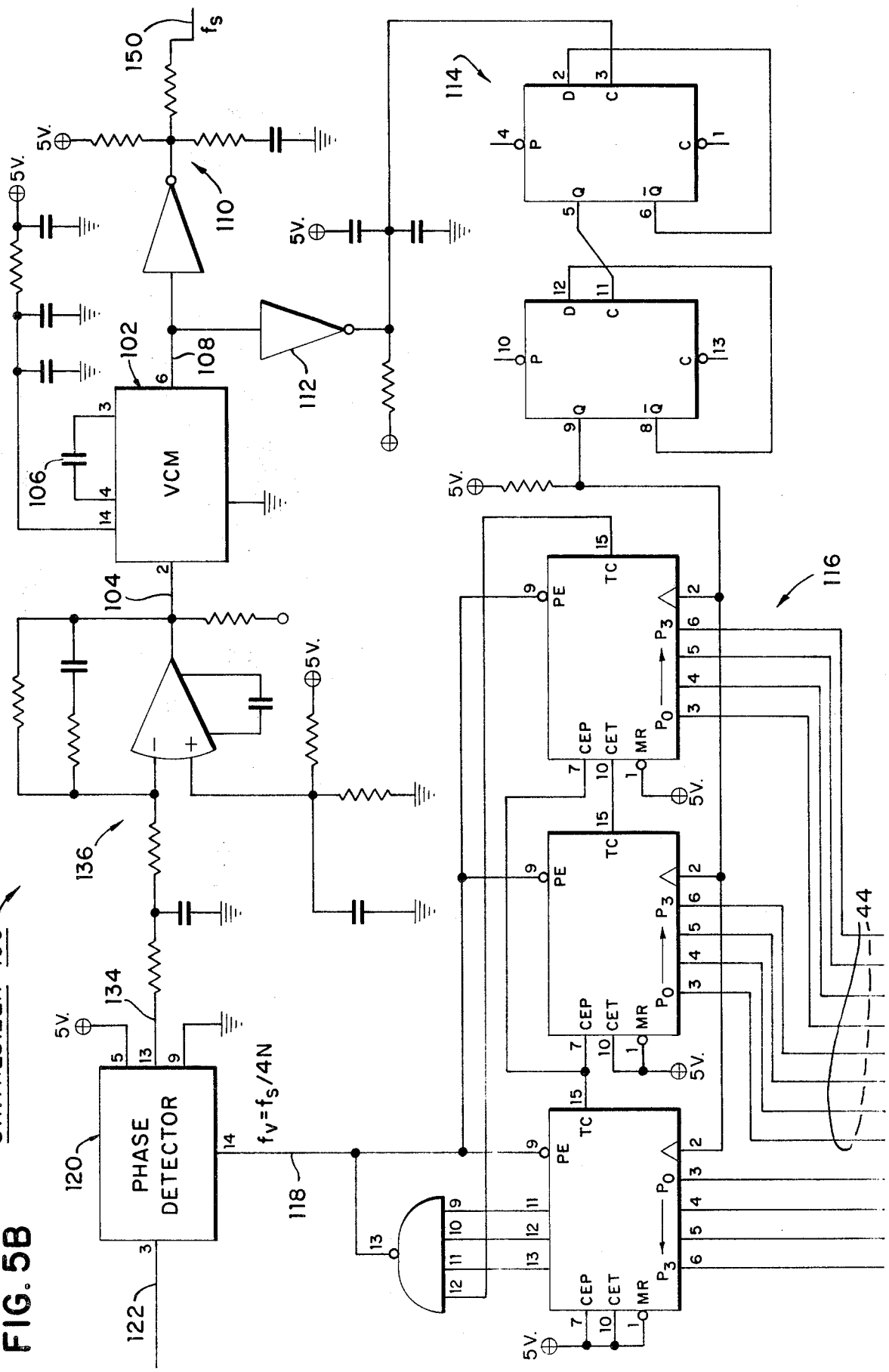
Figure 5C:
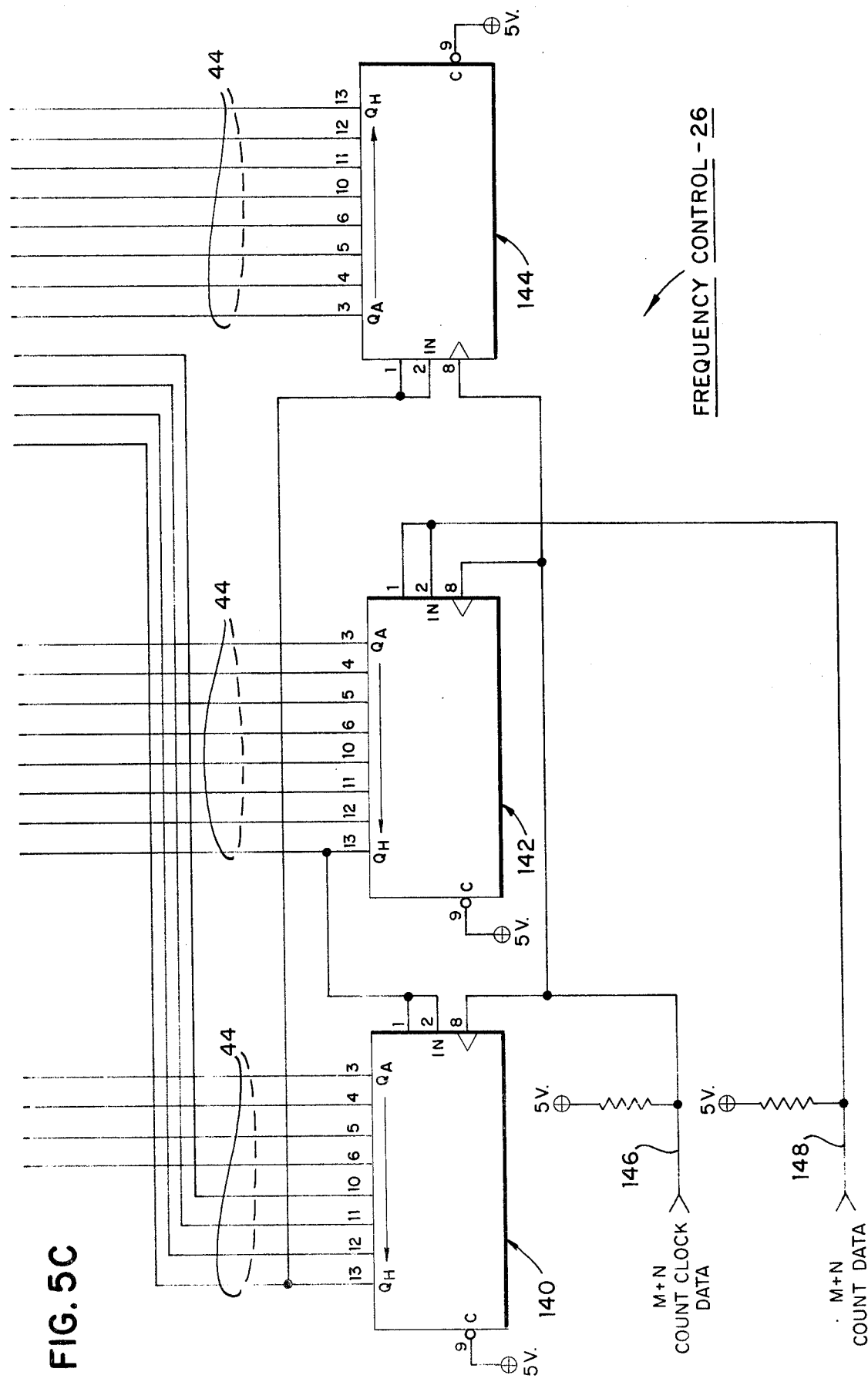

Considering now the specific details of one embodiment of the monitoring system 10 of the present invention and referring now to FIG. 5, the RF signal source 19, 54 of FIGS. 1 through 4 includes a frequency synthesizer 100 (FIGS. 5A and 5B) that generates an output frequency $f_s$ as determined by the frequency programming from the frequency control stage 26 of FIG. 5C. The output $f_s$ of the synthesizer 100 is connected through a pulse control gate and amplifier level control circuitry to a harmonic generator to provide the RF signal source output 18. The frequency signal $f_s$ of the synthesizer is appropriately controlled by the frequency control stage 26 such that a predetermined one of the harmonics of the output at 18 from the harmonic generator when combined with a corresponding video carrier signal at 14 results in the predetermined detection signal frequency at the video pickup 20 to the monitoring system 10 (FIGS. 5D and 5E). The pulse control stage 36, 70 controls operation of the pulse control gate circuitry of FIG. 5D. The level adjust input 56 from the system and advance control circuit 58 controls operation of the level adjust circuitry 200 of FIG. 5D.

Figure 7:
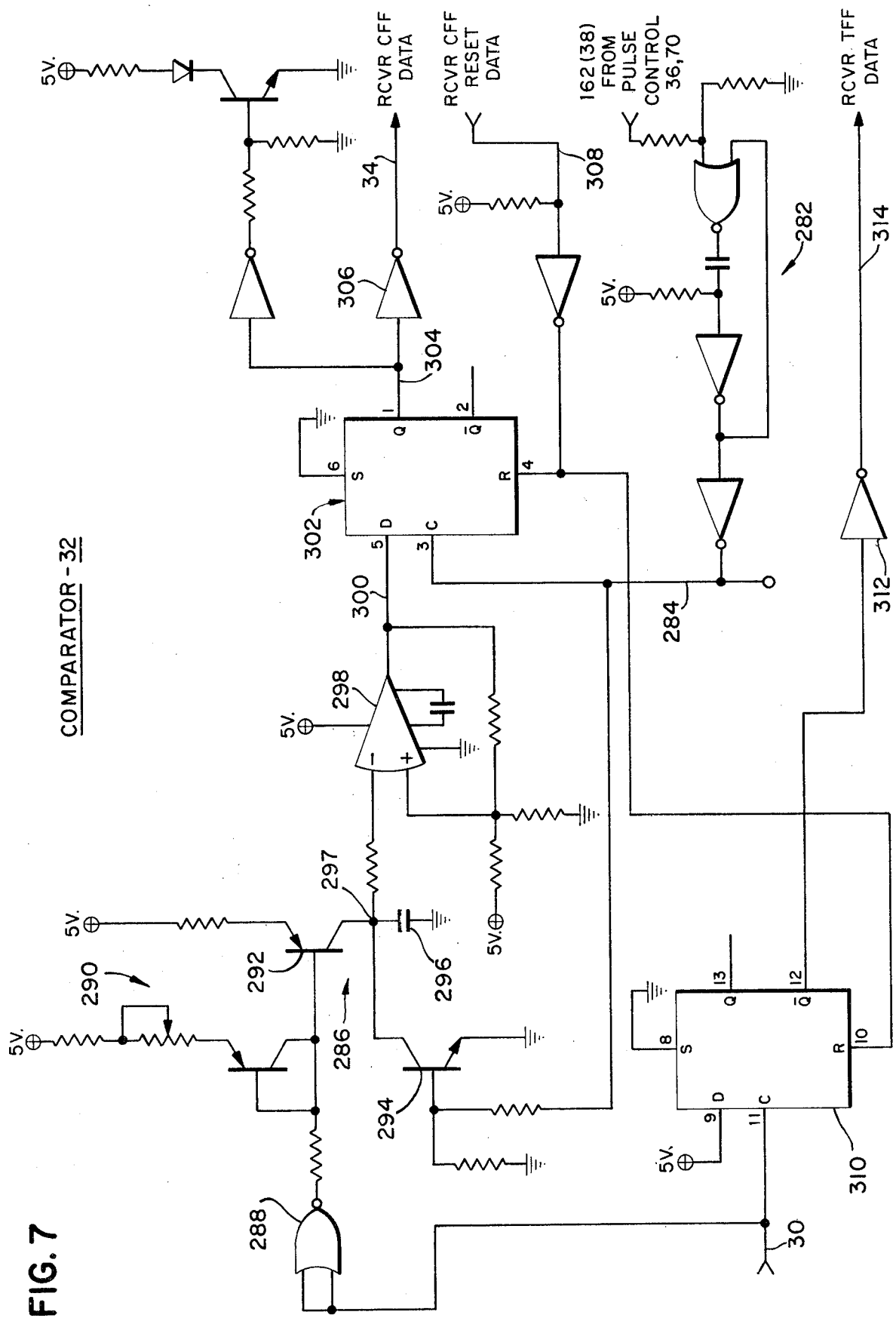
FIG. 7 is a detailed schematic and block diagram of the comparator of the monitoring system of FIGS. 1 through 3.

Referring now to FIG. 6, the detector/receiver 28, 50, 62 from the pick-up signal input 20 provides the detected signal output 30 to the comparator 32 of FIG. 7. The comparator 32 of FIG. 7 provides the coincidence output 34 to the system and advance control stage 24, 58 of FIG. 8.

Considering now the detailed structure and operation of the RF signal source 19 and specifically the synthesizer 100 of FIGS. 5A and 5B, the synthesizer 100 employs a digital phase-locked loop structure and includes a voltage controlled multivibrator (VCM) or oscillator stage 102 tuned at voltage control input 104 and by a basic frequency adjustment capacitor 106. The selection of the capacitor 106 is accomplished for suitable linear voltage to frequency conversion of the oscillator 102 over the range of 4 to 8 MHZ to minimize non-linear loop gain characteristics that might result in loop instabilities. The output 108 of the VCM stage 102 is connected through a buffering and shaping circuit 110 to provide the $f_s$ output signal to the harmonic generator 101.

The output 108 of the VCM stage 102 is also connected through a buffer 112 to two feedback frequency divider stages 114 and 116 of the phase-locked loop control circuitry. The feedback frequency divider stage 114 provides a divide by 4 factor of the frequency $f_s$ and the programmable feedback frequency divider stage 116 provides a programmable divide by N frequency division factor as controlled by the frequency programming signals 44 from the frequency control stage 26. Thus, the output 118 of the feedback frequency divider stage 116 provides the signal $f_v$ equal to $f_s/4$ N to one input of a digital phase detector stage 120.

A second input 122 to the phase detector 120 is the phase lock loop reference signal $f_{ref}$ equal to $f_0/4$ M. The $f_{ref}$ signal at 122 is derived from a crystal controlled reference oscillator and buffer stage 124 that generates at output 126 a signal of basic frequency $f_0$. In a specific embodiment, the frequency $f_0$ is 8.0095 MHZ. The $f_0$ output at 126 from the oscillator stage 124 is connected through a pre-scaling frequency divider including a first divide by 4 stage 128 and a divide by M stage 130 with the output of the divide by M stage 130 providing the $f_{ref}$ signal. The divide by M stage 130 is controlled by the frequency programming inputs 44 from the frequency control stage 26.

The digital phase detector stage 120 thus operates by comparing the two input signals $f_{ref}$ and $f_v$ and provides an output at 134 as an analog voltage signal representing the relative frequency and phase of the two input signals. The output 134 of the phase detector 120 is connected through a filter stage 136 functioning as a loop filter with the output of the loop filter 136 connected to the voltage control tuning input 104 of the VCM stage 102. Thus, for solutions within the operating range of the VCM stage 102, the phase detector 120 at 134 provides an output signal conditioning the VCM stage 102 to provide an output frequency $f_s$ in a phase locked condition with the two phase comparator inputs $f_v$ and $f_{ref}$ being of identical frequency and fixed in phase with $f_v$ equal to $f_{ref}$.

The divide by M stage 130 and the divide by N stage 116 are implemented by three four-bit synchronous counters that are cascaded to provide the M and N frequency division factors respectively. The division is programmed by frequency programming inputs 44 by the presentation of a 12 bit binary ones complement of M or N respectively to the combined parallel inputs of the counter stages within the respective frequency divider stages 130 and 116. Thus, integer frequency division of 1 through 4,095 is obtainable by applying the appropriate logic programming levels at 44 to the 12 bit parallel input to each of the frequency divider stages 130 and 116. The outputs of the frequency divider stages are obtained by summing the outputs of the respective counter stages at 118 and 122 respectively. The outputs 118 and 130 are non-symmetrical with a pulse width equal to the period of a single cycle of the input signals. Thus, the phase detector stage 120 is an edge-triggered device due to the non-symmetrical inputs to produce a phase error signal suitable for filtering and driving the VCM stage 102. In one specific embodiment, the phase detector 120 is implemented by utilizing the edge-triggered digital phase comparator of a CMOS phase-locked loop device.

Referring now to FIG. 5C, the frequency control stage 26 includes three eight bit serial to parallel shift register stages 140, 142, and 144 that present at their respective outputs to the frequency programming control lines 44 the appropriate M and N division data programming to the synthesizer divider stages 116 and 130. The shift registers 140, 142 and 144 are controlled by an M and N counter clock data line 146 from the system and advance control stage 24, 58. Further an M plus N count data line 148 from the system and advance control stage 24, 58 is connected to the shift register 142 and the shift registers 140 and 144 are appropriately interconnected in cascade with carry interconnections.

The system and advance control stage 24, 58 appropriately controls the data lines 146 and 148 to establish the parallel output data at frequency programming outputs 44 to the synthesizer 100 to step the frequency output $f_s$ of the synthesizer 100 in accordance with the predetermined set of program frequencies. The predetermined frequency set corresponds to the channel frequencies tunable by the video receiver 12 in accordance with the programmed operation of the system and advance control 24 as will be explained in more detail hereinafter.

Figure 5D:
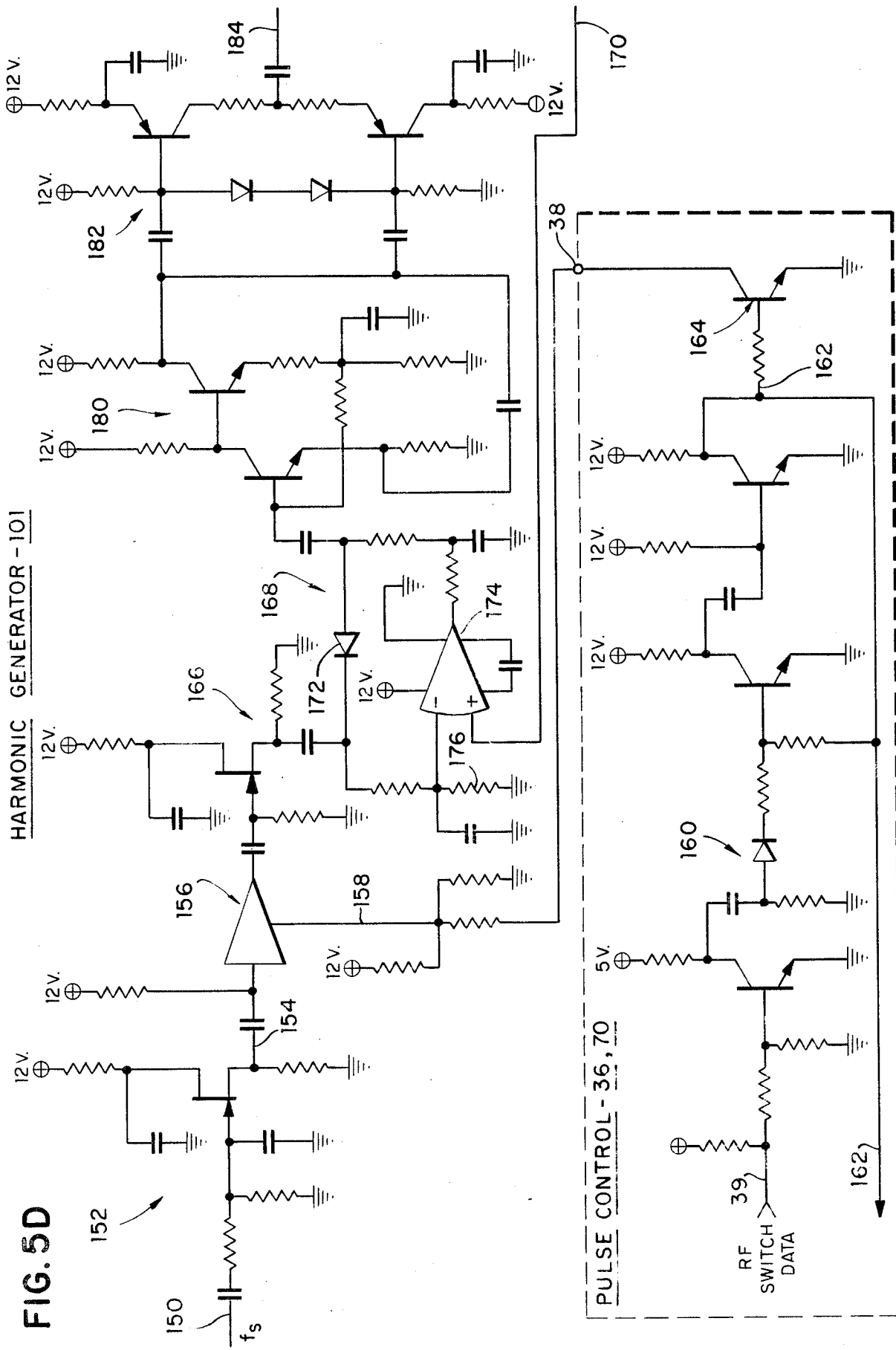
Figure 5E:
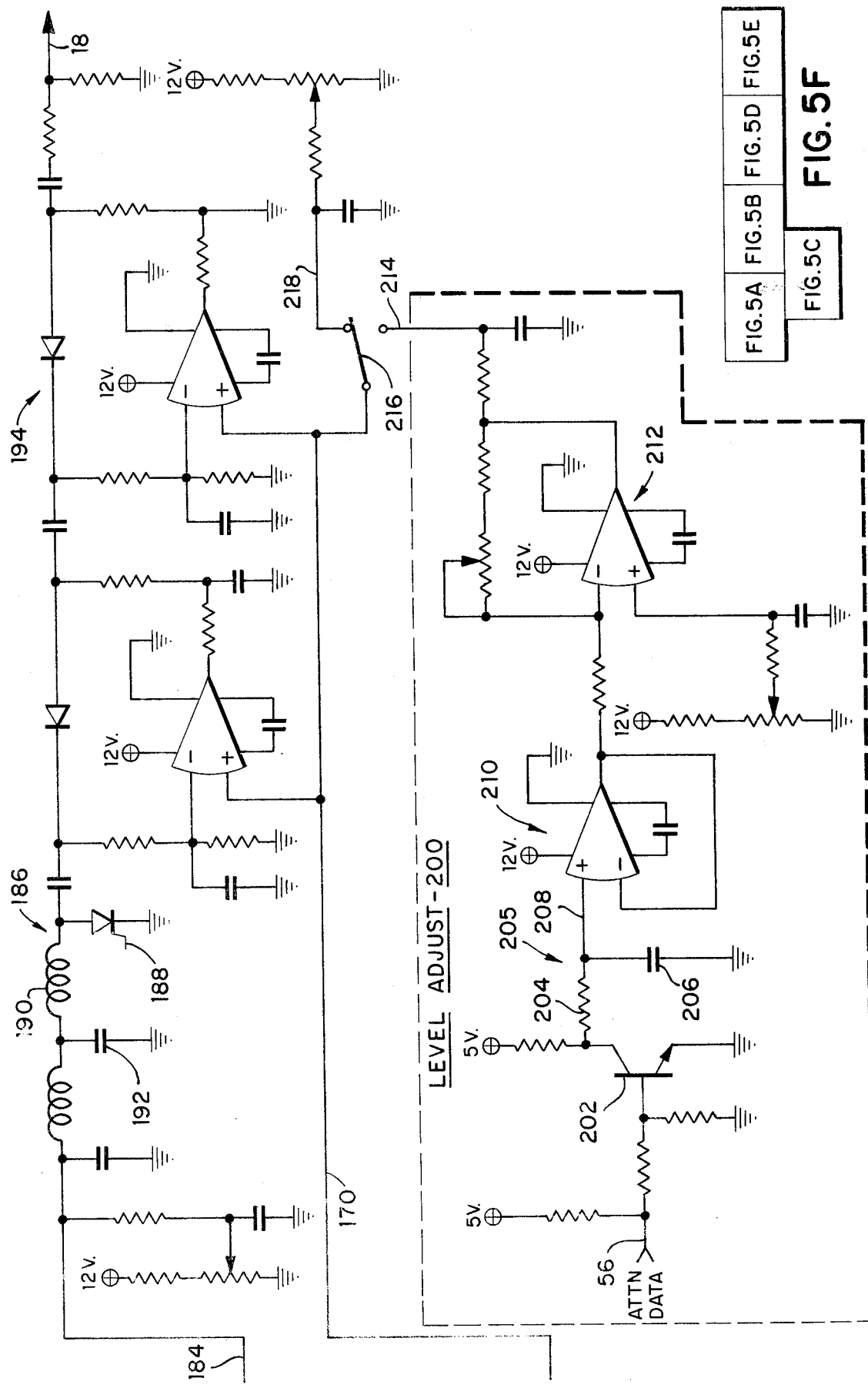

The $f_s$ signal output from the synthesizer 100 is connected to the harmonic generator 101 of FIGS. 5D and 5E of FIG. 5 at the input 150 of a buffer stage 152. The output 154 of the buffer stage 152 is connected to a pulse control gate stage 156 in the embodiments where pulse control of the RF signal source 19 is utilized. The pulse control gate stage 156 is controlled over an input 158 provided through a resistor from the pulse control output 38 of the pulse control stage 36, 70.

The pulse control stage 36, 70 (FIG. 5D) is controlled by the pulse initiate signal 39 from the system and advance control stage 24. The pulse initiate signal 39 is generated in accordance with the stored program of the system and advance control stage 24 as a transition signal to a monostable stage 160 of the pulse control stage 36, 70. In a specific embodiment the monostable stage 160 is triggered by the transition signal at the pulse initiate input 39 to provide a 50 microsecond pulse signal through the associated transistor stages at signal output 162. The buffered monostable output at 162 is connected to drive a transistor switch stage 164 to provide the pulse control output signal 38. The monostable output 162 is also connected to the comparator stage 32 to synchronize operation of the comparator during the pulse operation of the RF signal source 19 as will be explained in more detail hereinafter in connection with FIG. 7.

The output of the pulse control gate stage 156 is connected through a buffer stage 166 to a first attenuator stage 168 that includes a level adjust input 170 in the embodiments where RF level control of the RF signal source 19 is implemented. The attenuator stage 168 includes a PIN diode 172 with the RF resistance of the diode 172 varying inversely with respect to the forward DC current through the diode 172. An associated amplifier 174 of the first attenuator stage 168 drives a current proportional to its input voltage at line 170 and inversely proportional to a feedback resistor 176. As the input voltage at line 170 to the amplifier 174 increases, the feedback current increases and the RF resistance of the diode 172 decreases. The output of the attenuator stage 168 is connected through a buffer amplifier stage 180 and a drive amplifier stage 182 to provide a low impedance output at 184.

The output at 184 is connected to a harmonic generator stage 186 including a step recovery diode 188 in combination with storage elements including an inductor 190 and a capacitor 192. The harmonic generation is accomplished by means of the step recovery diode 188 exhibiting an effective capacitance change that is very rapid under changes in bias input such that a train of extremely narrow pulses are produced having a pulse width of approximately one nanosecond and in accordance with the period of the incoming signal. The output wave form of the harmonic generator stage 186 includes a spectrum of discrete frequencies that are integer multiples or harmonics of the incoming signal with a (sin x/x) amplitude characteristic. An extremely narrow pulse or impulse generated by the harmonic generator 186 produces a relatively flat envelope or spectrum such that the envelope exhibits a first zero-crossover at approximately 1 GHZ corresponding to a pulse width of approximately nanosecond.

The output of the harmonic generator 186 is connected through two attenuator stages generally referred to at 194 and similar to the first attenuator stage 168. The attenuator stages 194 are controlled by the level control input signal 170 to provide level control of the RF output signal at output 18 from the attenuators 194.

The output 18 of the RF signal source 19 as discussed hereinbefore is connected at the output of the monitoring system 10 to the antenna input of the video receiver 12.

In embodiments of the monitoring system 10 that provide the level adjust control signal 56 from the system and advance control stage 58 as shown in FIG. 3, the RF signal source 54 of FIG. 3 as shown in FIG. 5E includes the level adjust control stage 200 to provide the level control signal 170 to the attenuators 168 and 194 in response to the level adjust control signal 56.

The level adjust input signal 56 from the system and advance control stage 58 is a pulse width modulation signal having 32 discrete output steps in a specific embodiment. The pulse width modulation signal at 56 is connected through a switch and buffer stage 202 to a filter including resistor 204 and capacitor 206. The filter 205 operates as an integrator with exponential decay and with an integration limit dependent on the supply voltage to the filter 205. The output 208 of the filter 205 is thus the average value of the incoming pulse width modulation signal at 56. The output 208 of the filter 205 is connected through a buffer stage 210 and through an amplifier stage 212 to a level control output 214.

The harmonic generator 101 includes a two position switch 216 connectable between a local gain setting input 218 and the level adjust input 214 from the level control stage adjust stage 200. With the switch 216 in the level control position input 214, the attenuators 168, 194 and thus the RF output level at 18 are controlled in accordance with the level adjust stage 200 and the input signal 56 from the system and advance control 24.

Referring now to FIG. 6, the detector/receiver 28, 50, 62 of FIGS. 1 through 4 is a heterodyne receiver of fixed frequency $f_r$, the predetermined detection frequency. In a specific embodiment the receiver frequency $f_r$ is 1.5734 MHZ. Thus, the predetermined detection frequency $f_r$ represents the combinational frequency resulting from products of the RF signal source 19 at output 18 and the corresponding video channel carrier signal at antenna input 14.

The output from the RF signal source 19 at 18 is represented by $Qf_S$ where Q is the desired harmonic of the harmonic generator output derived from the synthesizer frequency $f_s$ as determined by the division factors $M_{QK}$ and $N_{QK}$ programmed by the system and advance control stage 24 and corrsponding to the video channel K.

Thus, the predetermined detection frequency $f_r$ is the offset between $Qf_S$ and the carrier frequency of video channel K. The programming factors $M_{QK}$ and $N_{QK}$ define the programming set corresponding to each of the channels tunable by the video receiver 12 and in a specific embodiment the 82 channels assigned in the United States.

The detector/receiver 28, 50, 62 of FIG. 6 includes a front end selectivity stage 230 connected to the video pickup input 20. In a specific embodiment the pickup input 20 is provided by a probe-wire pair or flat plate pair to couple electromagnetic radiation from the picture tube video drive conductors of the video receiver 12 to the detector/receiver. The front end selectivity stage 230 further provides low pass filtering for preselection and transient suppression. The output of the front end selectivity stage 230 is connected through a tuned cascade amplifier stage 232 and a buffer stage 234 to an amplifier gain stage 236. For embodiments where the detector/receiver 62 of FIG. 3 includes a gain adjustment control input 60 from the system and advance control stage 58, the gain stage 236 is controlled over control line 238 to vary the gain of the stage 236.

A gain adjust stage 240 (FIG. 6A) is responsive to the gain adjust input signal 60 from the system and advance control 58 to provide a gain control output at 242. The gain adjust stage 240 is similar in structure and operation to the level adjust stage 200 in the harmonic generator 101 of FIG. 5. The gain adjust input signal 60 provides a pulse width modulated signal in accordance with the desired gain to be controlled in the receiver such that the output at 242 is an average value of the incoming pulse width modulation signal at 60. The gain adjust output at 242 from the stage 240 is selectively connectable through a two position switch 244 to the gain control input 238 of the gain stage 236. A local receiver gain control arrangement 246 is also connectable through the switch 244 to the gain control input 238.

The output 250 of the gain stage 236 is coupled through an amplifier stage 252 to a first input 254 of a tuned mixer stage 256. A second input 258 to the mixer stage 256 is provided at the output of a local oscillator stage 260 that is crystal controlled for operation at 9.1266 MHZ in the specific embodiment corresponding to a receiver frequency $f_r$ equal to 1.5734 MHZ.

The mixer 256 is tuned to the sum of the incoming signal frequency from the gain stage 236 and the output signal of the local oscillator 260 to provide a tuned output signal at 262 of frequency $f_{if}$ equal to $f_r$ plus $f_{LO}$, where $f_{LO}$ is the frequency of the local oscillator 260. The output 262 of the mixer 256 is coupled through a buffer stage 264 to provide an output at 266 to the IF stages 268 of the receiver.

Considering embodiments of the monitoring system 10 provided with multiple detector frequency operations as discussed in connection with FIG. 2, additional local oscillators similar to oscillator stage 260 are provided operating at appropriate frequencies and selected by the system and advance control stage 24 over the frequency select input 52 to provide the signal $f_{if}$ when the selected $f_{LO}$ signal is combined with the corresponding detection frequency $f_r$.

The IF stages 268 include a crystal filter 270 having eight stages in a specific embodiment for suppression of unwanted difference terms from the mixer and of any spurious signals. In a specific embodiment the filter 270 provides a minus 6 db bandwidth of plus 15 KHZ from the center receiver frequency $f_r$ and a minus 60 db bandwidth of plus 30 KHZ with ultimate attenuation of minus 100 db.

The output 272 of the IF stages 268 is coupled to an envelope detector stage 276 through a buffer amplifier stage 274. The detector 276 provides a low pass filter time constant of approximately one microsecond in a specific embodiment. The output 278 of the detector 276 is connected through a detector comparator stage 280 to provide the output 30 to the comparator stage 32 of FIG. 7.

Referring now to FIG. 7, the comparator 32 is enabled during the pulse control interval of RF signal source operation by the pulse control input 162 from the pulse control stage 36, 70. Within this enabled window time, the comparator 32 accumulates the presence of a logical signal level at the input 30 from the detector/receiver to interrogate the proper detection of the predetermined detection frequency $f_r$ by the detector/receiver. If the total time of detected logic signal at 30 is greater than a predetermined percentage of the pulse control interval, the comparator stage 32 outputs a logic level at the output 34 to the system and advance control 58, 24 to establish a positive response to the injected signal corresponding to the video channel being received.

Specifically, a monostable/gate stage 282 is enabled to provide in a specific embodiment a 200 microsecond enable output at 284 in response to the reception of the control pulse (50 microseconds in a specific embodiment) at input 162 from the pulse control stage. The enable output 284 of the monostable/gate stage 282 is connected to enable operation of a charge accumulator stage 286. The input 30 to the comparator 32 is connected through an inverter 288 to the charge accumulator stage 286. A current adjust stage 290 controls the input to the charge accumulator stage 286. A high logic level at input 30 from the detector/receiver provides a low logic input to the charge accumulator 286.

The charge accumulator stage 286 includes a current source stage 292, a switch 294, and a storage capacitor 296. The enable output 284 of the monostable/gate stage 282 provides a low level enable signal during the enable time of the comparator 32 to hold the switch 294 off. During the enable time, the charge accumulator current source stage 292 allows accumulation of charge on the capacitor 296 from the signal from the detector/receiver at 30. In a specific embodiment, the charge accumulator stage 290 is arranged such that a total of 25 microseconds of the signal at 30 (50% of the pulse control width) will store sufficient charge on the capacitors 296 to provide an output at 297 sufficient to actuate a comparator 298.

At the end of the 200 microsecond enable window during which charge is allowed to accumulate on the capacitor 296 to actuate the comparator 298, the output 300 of the comparator 298 is stored in a flip-flop 302 controlled by the enable line 284. After the enable time controlled by signal 284, the switch 294 effectively dumps the accumulation of charge on the capacitor 296 and sinks current from the current source 292 to prevent further charge accumulation during the non-enabled time period. The Q output 304 of the flip-flop 302 is connected through a buffering inverter 306 to provide a coincidence signal 34 to the system and advance control stage 24, 58 to which the system and advance control stage responds by determining that the presently generated frequency by the RF signal source corresponds to the channel being received by the video receiver 12.

After the system and advance control stage interrogates the coincidence signal at 34, the flip-flop 302 is reset by the system and advance control stage by means of a reset input 308. In alternative embodiments a flip-flop 310 is connected to be clocked by the input signal 30 and the $\overline{Q}$ output of the flip-flop 310 is connected through an inverter 312 to provide a threshold output to the system and advance control stage 24, 58. In this arrangement the system and advance control stage is provided with information as to the presence of a response which may not be high enough to actuate the comparator 32. This information is utilized by the system and advance control to output appropriate receiver gain data at 60 for proper operation.

Figure 8B:
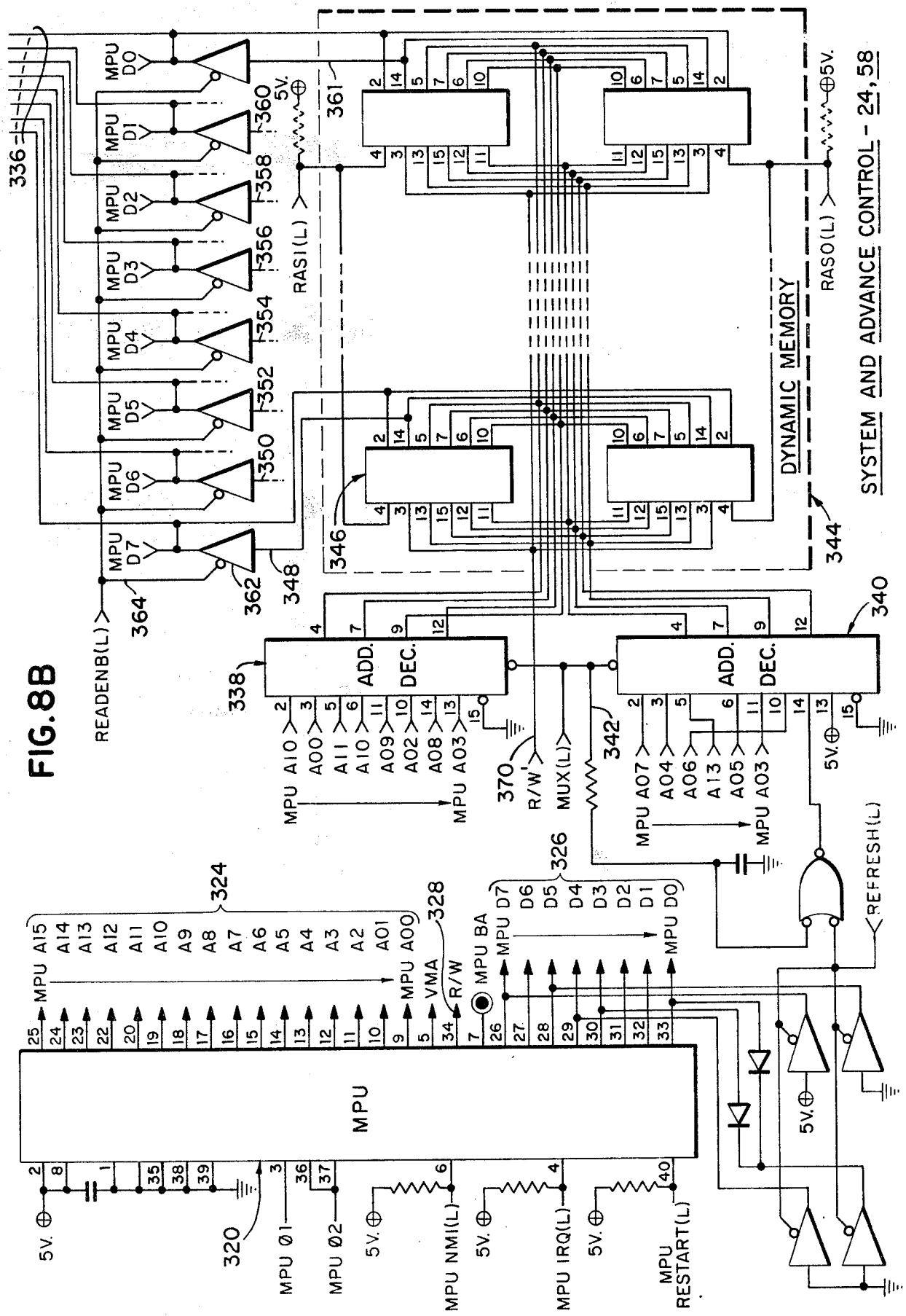
FIGS. 8A and 8B when assembled as shown in FIG. 8C represent a block and schematic diagram of the system and advance control stage of the monitoring system of FIGS. 1 through 4.
Figure 8C:
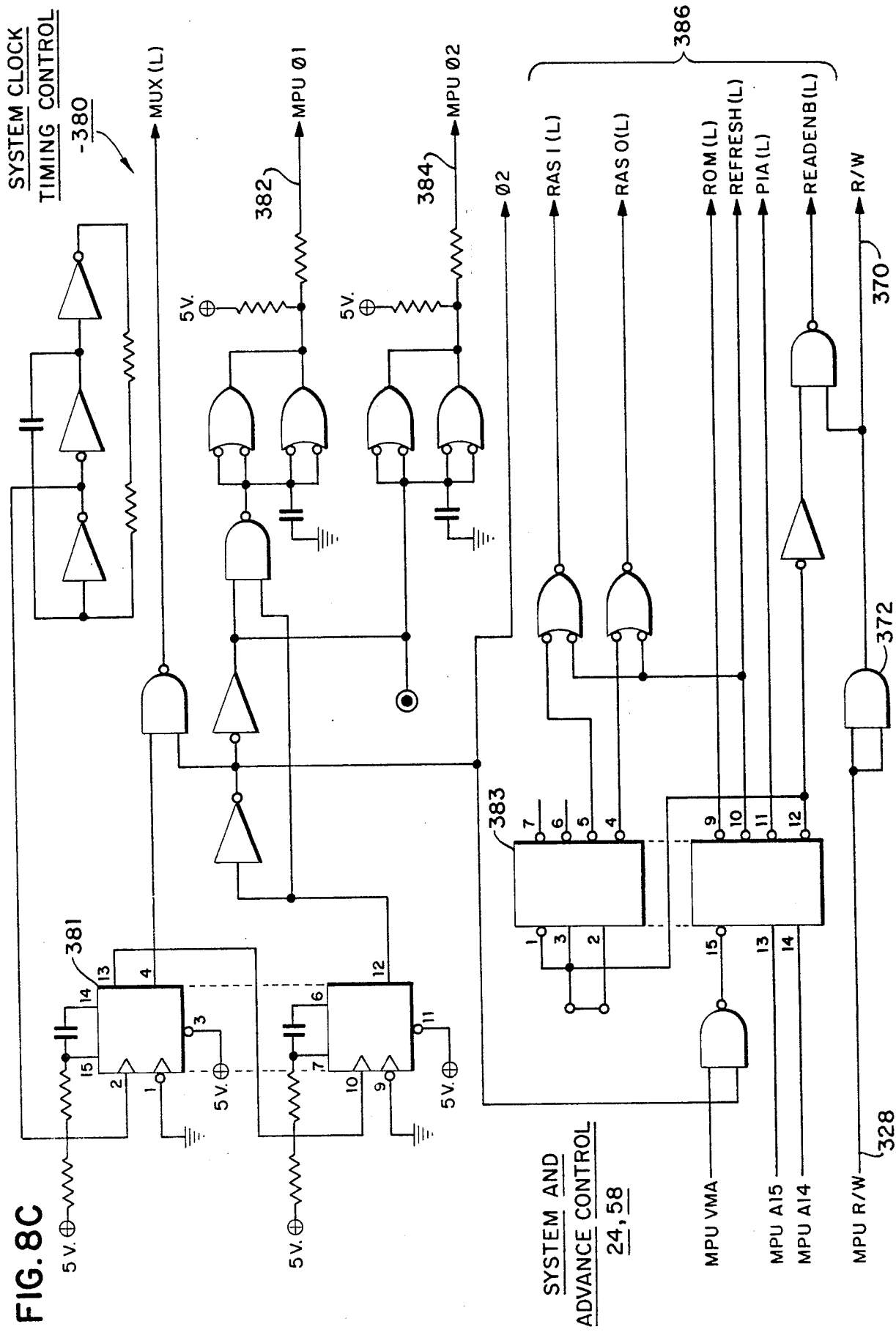

Referring now to FIG. 8, the system and advance control stage 24, 58 includes a microprocessor 320 preferably implemented by a large scale integrated microprocessor chip. The microprocessor 320 operates in accordance with a stored program for controlling operation of the monitoring system 10. An example of a suitable program for operation of the monitoring system 10 is illustrated in the attached Appendix A as will be explained in more detail hereinafter.

The microprocessor 320 includes control inputs referred to generally at 322, address outputs referred to generally at 324 on 16 data lines A00 to A15 representing $2^{16}$ address locations, data lines MPU D0-D7 referred to generally at 326 including eight data lines representing 28 bits of information and a read/write control line 328. In a specific embodiment, the microprocessor 320 is implemented by an MC6800 type device available from Motorola and reference may be made to the Motorola MC6800 microprocessor manual for a more detailed description of microprocessor operation.

The basic operating program for the microprocessor 320 is stored in ROM stages 330 and 332 that are addressed by the microprocessor on the address lines 324. Each of the ROM stages 330 and 332 includes eight data output lines referred to at 334 and 336 respectively with parallel corresponding connections to the corresponding microprocessor data lines 326 to provide program data information at the preselected address steps to the microprocessor 320.

The address data lines 324 of the microprocessor 320 are also connected as address inputs to two address decoder stages 338 and 340 that provide address information on output control lines 342 to control a dynamic memory stage 344 that provides RAM data storage functions. In a specific embodiment the dynamic memory stage 344 is implemented by 16 interconnected RAM chips 346 each providing 4K×1 data storage locations and bits of information. The dynamic memory at appropriate outputs of the RAM chips 364 provides data outputs 348, 350, 352, 354, 356, 358, 360 and 361 each connected to an input of a tri-state buffer control 362. The output of each tri-state buffer device 362 is respectively connected to a corresponding one of the microprocessor data lines MPU DO-D7, 326. The operational state of each of the tri-state buffers 362 is controlled by a read enable control line 364. Thus by means of the read enable control line 364, either the ROM memory stages 330, 332 or the dynamic memory 344 may be addressed with the appropriate data being read out onto the microprocessor data lines at 326. A ROM control line 366 is arranged to control the enabling of the output of data by the ROM stages 330, 332 through a ROM control switch stage 368.

The dynamic memory stage 344 also includes a read/write control line 370 derived from the microprocessor read/write control line 328 by an inverter gate 372. The dynamic memory 344 also includes the connection of the microprocessor data lines 326 at input data lines to the respective RAM chips 346 for the writing of data.

The system and advance control 24, 58 also includes system clock and timing control stages referred to generally at 380 and including a basic clock stage 381 and a control stage 383 that provide basic clock signals at 382 and 384 as two clock phase intervals, and microprocessor and memory stage control functions generally referred to at 386.

The system and advance control stage 24, 58 also includes an interface controller stage 390. The interface controller stage 390 includes as inputs the data signals 326 and other control functions generated by the system and advance control stages to provide the appropriate outputs to the monitoring system 10. The outputs of the interface controller 390 include the M plus N data signal 148; the M plus N clock signal 146 to the frequency control stage 26; the coincidence signal 34; the comparator reset signal 308 to the comparator 32; the threshold signal 314 from the comparator 32; the level adjust signal 56 to the level adjust stage 200; the receiver gain input signal 60 to the receiver detector stage 20, 50, 62; and the pulse control signal 39 to the pulse control stage 36, 70.

The system and advance control 24, 58 by means of the microprocessor 320 and the stored program begins operation of the monitoring system 10 by initialization of the various stages of the monitoring system 10 through the interface controller 390 with the appropriate control of signal variables. Next the first M and N count data is withdrawn from a table identified NMTABL (program reference location I-1). In a specific embodiment 20 RF pulses are implemented. Thus, the RF signal source 19 outputs the selected frequency $f_s$ by means of the harmonic generator and specifically the signal of interest $Qf_S$ during 20 timed RF pulses at the signal output 18. The response of the detector/receiver 28 in comparator 32 by means of coincidence output 34 is accumulated by the microprocessor 320 (program reference I-8). If a proper response is not obtained indicating that the video receiver 12 was not tuned to the channel corresponding to the first generated frequency, the next M and N count numbers are accessed from the table.

The program of Appendix A steps through the M and N table and thus controls the RF signal source 19 to generate signals corresponding to each of the channels tuned by the video receiver 12 until a response is received at coincidence output 34 either by means of a long table or a short table implementation. In a preferred embodiment, the short table program is implemented first and if a response is not received from the short table set of program frequencies, then the long table is accessed corresponding to each of the channels being stepped through that is tuned by video receiver 12. The short table represents the most commonly tuned channels of the video receiver 12 for a particular area and is capable of being updated to the changing station allocations and viewer behavior.

In accordance with the particular embodiments where RF level control is provided by signal output 56 to the RF signal source 54 of FIG. 3, the microprocessor 320 also controls the increase in RF output at 18 after each completion of the M plus N tables are utilized to generate the frequency sets and no response is obtained. Specifically, the table in the Appendix at page A24 correlates the M plus N data, the frequency synthesizer signal $f_s$ and the injected frequency $Qf_r$ at 18 and the associated channel representation.

For example, when the monitoring system 10 injects a signal at 18 to monitor whether the video receiver 12 is tuned to channel 2, the synthesized frequency $f_s$ is 5.165769 MHZ and the injected frequency $Qf_s$ is equal to 56.82342634 MHZ corresponding to a video carrier frequency for channel 2 of 55.25 MHZ. Thus, the combined resultant signal from the injected frequency and the channel 2 video carrier is 1.5734 MHZ equal to the receiver frequency $f_r$. Detailed values for synthesized frequency and injected frequency are calculated by the use of a computer to obtain injection frequencies such that the harmonics of the synthesized frequency will not combine with the video carrier frequencies of other received channels that might cause false outputs from the detector/receiver 28. Thus, the table (program reference I-1) contains the N and M numbers corresponding to each of the 82 channels assigned to the U.S. referred to as NMTABL. Program operation for the program portion or sub-routine identified as TBLSTX (program reference I-2) accesses the table NMTABL either in an iterative fashion termed a long table implementation or discretely from previously identified channels stored in the short table identified as NMTBLO (program reference I-3). The program operation of the sub-routine identified as NMSHFX (program reference I-4) outputs the N and M data bits via the peripheral controller 390 (program reference I-5) to the frequency control stage 26. The portion of the program relating to the RF pulse control by means of the peripheral controller 390 is found at program reference I-6.

The following component devices available from Motorola, Texas Instruments and RCA have been found suitable to practice the present invention and should be considered as illustrative only and not in any limiting sense:

| | |
|---|---|
| SYNTHESIZER 100 | |
| Phase Detector 120 | MC4046 |
| VCM 102 | MC4024 |
| Divider Stages 116 and 130 | 40161 (three) |
| Divider Stages 114 and 128 | 74LS74 (three) |
| FREQUENCY CONTROL 26 | |
| Shift Registers 140, 142, 144 | 74C164 |
| COMPARATOR 32 | |
| Flip-Flops 302 and 310 | 4013 |
| SYSTEM AND ADVANCE CONTROL 24, 58 | |
| Microprocessor 320 | MC6800 |
| Peripheral Controller 390 | MC6820 |
| Address Decoders 338, 340 | 74LS157 |
| Basic Clock 381 | 74LS221 |
| Control Stage 383 | 74LS139 |
| RAM Stages 346 | MK4096 |

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed and desired to be secured by Letters Patent of the United States is:

1. Apparatus for determining the video channel of a plurality of predetermined channels to which a video receiver is tuned, said video receiver including a signal input for the video channel carrier signals of said predetermined channels, channel selection and tuning apparatus, and a video circuit, said apparatus comprising:
  signal source means being selectively controllable and coupled to said signal input of said video receiver for generating one of a predetermined plurality of signal frequencies in a predetermined frequency set, each of said signal frequencies in said predetermined frequency set corresponding to one of said predetermined channels tuned by said video receiver and defined by a predetermined offset frequency $f_r$ from each of said channel frequencies;
  means for controlling said signal source generating means; and
  means responsive to said video receiver for detecting a predetermined detection frequency signal $f_r$ resulting from the combination of the signal generated by said signal source generating means and the video carrier signal corresponding to the channel to which said video receiver is tuned,
  said signal source controlling means comprising means for advancing said signal source generating means to generate successive ones of said signal frequencies at predetermined time intervals.

2. The apparatus as recited in claim 1 wherein said signal source controlling means further comprises pulse control means for operating said signal source generating means in a repetitive pulsed mode having a predetermined signal frequency pulse duration and a predetermined off duration.

3. The apparatus as recited in claim 1 wherein said signal source generating means comprises programmable frequency synthesizer means, and frequency programming means responsive to said signal source controlling means for controlling the frequency of operation of said synthesizer means.

4. The apparatus as recited in claim 3 wherein said programmable frequency synthesizer generates a frequency $f_s$ and said signal source generating means further comprises harmonic generator means for generating a frequency of $Qf_s$ that represents a predetermined offset from a corresponding channel video carrier signal of said video receiver, said signal frequency $f_s$ being programmable over a predetermined frequency range by said frequency programming means, said frequency $Qf_s$ representing a predetermined harmonic Q of the frequency $f_s$.

5. The apparatus of claim 2 wherein said detecting means further comprises comparator means responsive to the detection of said predetermined frequency signal $f_r$ and said pulse control means for generating a coincidence signal representing the detection of said signal $f_r$ during a predetermined enable time period related to said pulse operation time of said signal source generating means.

6. The apparatus of claim 5 wherein said comparator means further comprises detection accumulation means for determining the total time during which said detected signal $f_r$ is present in said predetermined enable time period and for providing said coincidence signal when said accumulated total detection time of said detected signal exceeds a predetermined value.

7. The apparatus of claim 5 wherein said signal source controlling means is responsive to said coincidence signal to advance said signal source generating means when no coincidence signal is provided during said enable time period.

8. The apparatus of claim 7 wherein said signal source controlling means further comprises means responsive to the presence of said coincidence signal during said enable time period for outputting a representation of the video channel corresponding to the programmed signal frequency being generated by said signal source generating means.

9. The apparatus of claim 3 wherein said programmable frequency synthesizer means comprises a phase locked loop operating at a frequency equal to $f_s$ divided by a division factor n where $f_s$ is the output frequency of said synthesizer means.

10. The apparatus of claim 9 wherein said division factor n is determined by said frequency programming means, said signal source controlling means further comprising frequency selection control means for outputting frequency control data to said frequency programming means to condition said frequency programming means to determine the appropriate corresponding division factor n corresponding to an associated video channel carrier signal.

11. The apparatus of claim 10 wherein said frequency programming means comprises frequency division factor memory means for accumulating the division factor n, said frequency selection control means comprising frequency control data means for outputting incremental frequency division factor data to said frequency division factor memory means.

12. The apparatus of claim 11 wherein said frequency division factor memory means comprises shift register means for receiving said incremental division frequency factor data in a serial digital format and for outputting said division factor n in a parallel digital format to said frequency synthesizer, said frequency control data means comprising means for outputting said frequency division factor data in a serial form.

13. The apparatus of claim 2 wherein said signal source controlling means further comprises timing control means for controlling said pulse control means to operate said signal source means for a predetermined number of pulse output durations and for controlling said advancing means to advance said signal source means to generate the next successive one of said signal frequencies after said predetermined number of pulse output durations.

14. The apparatus of claim 1 or 2 further comprising means for successively increasing the output level of said signal source generating means from an initial reference level after each time that said predetermined frequency set has been generated without said detection means detecting said predetermined frequency signal $f_r$.

15. The apparatus of claim 1 wherein said detecting means comprises receiver means tuned to the frequency $f_r$ and further comprising means responsive to said detecting means for selectively controlling the gain of said receiver in a predetermined manner based on the output of said detecting means.

16. The apparatus of claim 15 wherein said detecting means further comprises a detector circuit responsive to said receiver means for providing a first output when said $f_r$ signal is received and a second output representing a predetermined valid output when said $f_r$ signal is received for a predetermined period of time.

17. The apparatus of claim 16 wherein said gain controlling means further comprises means for increasing the gain by predetermined steps after each time said predetermined frequency set has been generated without said detector providing said second output.

18. The apparatus of claim 2 wherein said video receiver includes a vertical sweep control circuit and further comprising vertical synchronization means responsive to said vertical sweep control circuit to enable said pulse output of said signal source generating means during the vertical interval of the video receiver corresponding to a video portion not normally presented for viewing.

19. The apparatus of claim 18 wherein said video receiver includes a horizontal sweep control circuit and further comprising horizontal synchronization means responsive to said horizontal sweep control circuit to enable said pulse output of said signal source generating means between the horizontal synchronization pulses of video lines in the vertical interval.

20. The apparatus of claim 1 further comprising video signal pickup means having no physical connection to said video receiver for providing the video signal of said video circuit to said detecting means.

21. The apparatus of claim 19 further comprising horizontal and vertical sweep signal pickup means having no physical connection to said horizontal or vertical sweep control circuits for providing horizontal and vertical sweep synchronization pulses to said horizontal synchronization means and said vertical synchronization means.

22. The apparatus of claim 1 wherein said detecting means is selectively conditionable to detect two or more predetermined detector frequency signals, each of said predetermined detection frequency signals corresponding to predetermined ones of said signals in said predetermined frequency set.

23. The apparatus of claim 22 further comprising means responsive to said signal source controlling means for conditioning said detecting means to one of said predetermined detection frequency signals.

24. The apparatus of claim 4 wherein said plurality of predetermined frequencies in said predetermined frequency set are selected such that no harmonic of said synthesizer signal $f_s$ corresponding to each of said video channels results in a combinational product with any of said video channel carrier signals equal to said predetermined detection signal frequency $f_r$ other than the video channel carrier signal corresponding to said generated $f_r$ signal frequency in said frequency set.

25. The apparatus of claim 1 further comprising means responsive to said detecting means and said signal source controlling means for outputting a representation of the video channel tuned and received by said video receiver.

26. A method for determining the channel of a plurality of predetermined channels to which a video receiver is tuned, the video receiver including a signal input for the video channel carrier signals of said predetermined channels, channel selection and tuning apparatus, and a video circuit, said method comprising the steps of:

supplying at said signal input of said video receiver one of a predetermined plurality of signal frequencies in a predetermined frequency set, each of said signal frequencies corresponding to one of said predetermined channels tuned by the video receiver and defined by a predetermined offset frequency $f_r$ from each of said channel frequencies;

detecting the presence of a predetermined detection signal frequency $f_r$ in the video receiver; and successively advancing the supplied signal frequency in said frequency set by one increment in said frequency set at predetermined time intervals.

27. The method of claim 26 wherein said supplying step further comprises the step of providing each of said signal frequencies for a predetermined number of pulse duration times separated by off duration times.

28. The method of claim 27 wherein said detecting step further comprises the steps of accumulating the total time during which said detected signal $f_r$ is present during a time period related to each pulse duration time and providing a coincidence signal when said accumulated total detection time of said detected signal exceeds a predetermined value.

29. The method of claim 26 further comprising the step of providing a representation of the channel to which the video receiver is tuned responsive to said detected presence of said detection signal frequency.

30. The method of claim 26 wherein said supplying step further comprises the step of providing said frequency signals at said signal input in a pulse mode.

31. The method of claim 30 further comprising the step of additionally supplying said signal frequencies at successively increasing levels after each time the predetermined frequency set is supplied without said detecting step detecting the presence of said predetermined detection signal.

32. The method of claim 26 wherein the video receiver includes a vertical sweep control circuit and said method further comprises the steps of enabling said supplying steps during the vertical interval of the video receiver corresponding to a video portion not normally presented for viewing.

33. The method of claim 32 wherein said video receiver further includes a horizontal sweep control circuit and said method further comprises the step of enabling said supplying step between the horizontal synchronization pulses of video lines in the vertical interval.

34. The method of claim 26 wherein said detecting step comprises the step of picking up the video signal of the video circuit of the video receiver without physical connection to the video receiver.

* * * * *